United States Patent
Dutta et al.

(10) Patent No.: US 11,985,631 B2
(45) Date of Patent: May 14, 2024

(54) RECONFIGURABLE SURFACES FOR SIDELINK COMMUNICATIONS

(71) Applicant: QUALCOMM Incorporated, San Diego, CA (US)

(72) Inventors: Sourjya Dutta, San Diego, CA (US); Kapil Gulati, Belle Mead, NJ (US); Junyi Li, Fairless Hills, PA (US); Shuanshuan Wu, San Diego, CA (US); Anantharaman Balasubramanian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 385 days.

(21) Appl. No.: 17/411,874

(22) Filed: Aug. 25, 2021

(65) Prior Publication Data

US 2023/0068083 A1 Mar. 2, 2023

(51) Int. Cl.
*H04W 4/00* (2018.01)
*H04B 17/318* (2015.01)
(Continued)

(52) U.S. Cl.
CPC .......... *H04W 72/02* (2013.01); *H04B 17/318* (2015.01); *H04L 1/1607* (2013.01);
(Continued)

(58) Field of Classification Search
CPC ... H04W 72/02; H04W 72/044; H04W 72/20; H04W 92/18; H04W 28/04; H04W 72/04;
(Continued)

(56) References Cited

U.S. PATENT DOCUMENTS

| | | |
|---|---|---|
| 2016/0150390 A1 | 5/2016 | Chen et al. |
| 2020/0154404 A1* | 5/2020 | Göktepe ............... H04L 5/0053 |
| 2020/0228252 A1 | 7/2020 | Sundararajan et al. |
| 2022/0191674 A1* | 6/2022 | Ly ...................... H04J 13/0062 |

(Continued)

FOREIGN PATENT DOCUMENTS

| | | |
|---|---|---|
| CN | 112039567 A | 12/2020 |
| WO | WO-2021109345 A1 | 6/2021 |

OTHER PUBLICATIONS

International Search Report and Written Opinion—PCT/US2022/074381—ISA/EPO—dated Jan. 23, 2023.
(Continued)

*Primary Examiner* — Phuongchau Ba Nguyen
(74) *Attorney, Agent, or Firm* — Holland & Hart LLP

(57) ABSTRACT

Methods, systems, and devices for wireless communications are described. A first user equipment (UE) may be associated with a reconfigurable surface for reflecting transmissions between second and third UEs (e.g., over sidelink resources). In one example, the first UE may transmit signaling indicating that retransmissions of a first message transmitted between a second and third UE and detected by the first UE may be reflected by the reconfigurable surface associated with the first UE. In another example, the first UE may receive a request from a second UE for signal enhancement using a reconfigurable surface, the request associated with a future transmission by the second UE to a third UE. In either case, the UE may determine to perform signal enhancement using a reconfigurable surface and may then reconfigure the reconfigurable surface for reflecting transmissions or retransmissions from the second UE to the third UE.

17 Claims, 16 Drawing Sheets

(51) Int. Cl.
*H04L 1/1607* (2023.01)
*H04W 72/02* (2009.01)
*H04W 72/044* (2023.01)
*H04W 72/20* (2023.01)
*H04W 92/18* (2009.01)

(52) U.S. Cl.
CPC ......... *H04W 72/044* (2013.01); *H04W 72/20* (2023.01); *H04W 92/18* (2013.01)

(58) Field of Classification Search
CPC ... H04W 72/042; H04W 88/08; H04W 28/08; H04W 28/084; H04W 36/22; H04W 72/12; H04B 17/318; H04B 7/04013; H04B 7/022; H04B 7/0617; H04L 1/1607; H04L 1/1825; H04L 2001/0093; H04L 1/16; H04L 1/1887; H04L 1/1896; H04L 5/0007
See application file for complete search history.

(56) References Cited

U.S. PATENT DOCUMENTS

2022/0377730 A1* 11/2022 Yang ................ H04W 52/36
2022/0416933 A1* 12/2022 Nam ................ H04W 40/248
2023/0308139 A1* 9/2023 Baligh ............... H04B 7/04013
2023/0327714 A1* 10/2023 Baligh ................ H04B 7/0413
375/262

OTHER PUBLICATIONS

Chen Y., et al., "Reconfigurable Intelligent Surface Assisted D2D Networks: Power and Discrete Phase Shift Design", Globecom 2020—2020 IEEE Global Communications Conference, IEEE, Dec. 7, 2020, 6 Pages, XP033882361, DOI: 10.1109/GLOBECOM42002. 2020.9322087, [retrieved on Jan. 13, 2021] p. 2-p. 3, figure 1.
Partial International Search Report—PCT/US2022/074381—ISA/ EPO—dated Oct. 26, 2022.

* cited by examiner

RECONFIGURABLE SURFACES FOR SIDELINK COMMUNICATIONS

FIELD OF TECHNOLOGY

The following relates to wireless communications, including reconfigurable surfaces for sidelink communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support reconfigurable surfaces for sidelink communications. Generally, the described techniques provide for reflecting sidelink transmission using reconfigurable surfaces (e.g., reconfigurable intelligent surfaces (RISs). Specifically, a first user equipment (UE) may be associated with a reconfigurable surface for reflecting transmissions between second and third UEs (e.g., over sidelink resources). In one example, the first UE may detect a first message between the second and third UE and may determine that configuring the RIS to reflect retransmissions of the first message may improve a signal quality of the retransmissions (e.g., when compared to a signal quality of the first message not reflected by the RIS). Here, the first UE may transmit signaling indicating that retransmissions of a first message transmitted between the second and third UE may be reflected by the reconfigurable surface associated with the first UE. In another example, the first UE may receive a request from a second UE for signal enhancement using a reconfigurable surface, the request associated with a future transmission by the second UE to a third UE. Here, the first UE may determine to configure the reconfigurable surface associated with the first UE based on receiving the request. In either case, the UE may reconfigure the reconfigurable surface for reflecting transmissions or retransmissions from the second UE to the third UE, thus improving a quality of transmissions or retransmissions from the second to the third UE (e.g., when compared to transmissions not reflected by a reconfigurable surface).

A method for wireless communication at a first user equipment (UE) is described. The method may include detecting, at the first UE, an indication of a first message transmitted over sidelink resources from a second UE to a third UE, transmitting signaling indicating that retransmissions of the first message are reflected by a reconfigurable surface associated with the first UE, and configuring the reconfigurable surface associated with first UE for reflecting the retransmissions of the first message from the second UE.

An apparatus for wireless communication at a first UE is described. The apparatus may include a processor, memory coupled with the processor, and instructions stored in the memory. The instructions may be executable by the processor to cause the apparatus to detecting, at the first UE, an indication of a first message transmit over sidelink resources from a second UE to a third UE, transmit signaling indicating that retransmissions of the first message are reflected by a reconfigurable surface associated with the first UE, and configure the reconfigurable surface associated with first UE for reflecting the retransmissions of the first message from the second UE.

Another apparatus for wireless communication at a first UE is described. The apparatus may include means for detecting, at the first UE, an indication of a first message transmitted over sidelink resources from a second UE to a third UE, means for transmitting signaling indicating that retransmissions of the first message are reflected by a reconfigurable surface associated with the first UE, and means for configuring the reconfigurable surface associated with first UE for reflecting the retransmissions of the first message from the second UE.

A non-transitory computer-readable medium storing code for wireless communication at a first UE is described. The code may include instructions executable by a processor to detecting, at the first UE, an indication of a first message transmit over sidelink resources from a second UE to a third UE, transmit signaling indicating that retransmissions of the first message are reflected by a reconfigurable surface associated with the first UE, and configure the reconfigurable surface associated with first UE for reflecting the retransmissions of the first message from the second UE.

Some examples of the method, apparatuses, and non-transitory computer-readable medium described herein may further include operations, features, means, or instructions for receiving control information from the second UE, where detecting the indication of the first message may be based on receiving the control information.

Some examples of the method, apparatuses, and non-transitory computer-readable medium described herein may further include operations, features, means, or instructions for selecting one or more coefficients for configuring for the reconfigurable surface for reflecting the retransmissions of the first message based on the control information, information from one or more sensors at the first UE, map information at the first UE, or a combination thereof.

In some examples of the method, apparatuses, and non-transitory computer-readable medium described herein, the control information includes a location of the second UE, an identifier of the third UE, a location of the third UE, a group identifier associated with one or both of the second UE and the third UE, a range associated with the first message, a priority associated with communications with UEs, a priority associated with communications with one or more sets of UEs, or a combination thereof.

In some examples of the method, apparatuses, and non-transitory computer-readable medium described herein, receiving the control information may include operations, features, means, or instructions for receiving sidelink control information, receiving a medium access control-control element, or a combination thereof.

In some examples of the method, apparatuses, and non-transitory computer-readable medium described herein, transmitting the signaling may include operations, features, means, or instructions for transmitting the signaling via a physical sidelink feedback channel using resources associated with feedback for the first message.

In some examples of the method, apparatuses, and non-transitory computer-readable medium described herein, transmitting the signaling may include operations, features, means, or instructions for transmitting a first sequence from a first set of sequences, where the first set of sequences may be unique from a second set of sequences associated with negative acknowledgement signaling and acknowledgement signaling.

In some examples of the method, apparatuses, and non-transitory computer-readable medium described herein, transmitting the signaling may include operations, features, means, or instructions for transmitting the signaling via a physical sidelink feedback channel using resources nonoverlapping with resources associated with feedback for sidelink transmissions.

In some examples of the method, apparatuses, and non-transitory computer-readable medium described herein, transmitting the signaling may include operations, features, means, or instructions for transmitting a first sequence from a first set of sequences associated with negative acknowledgement signaling or a second sequence from a second set of sequences reserved for indicating that retransmissions of the first message may be reflected by the reconfigurable surface.

In some examples of the method, apparatuses, and non-transitory computer-readable medium described herein, transmitting the signaling may include operations, features, means, or instructions for transmitting the signaling via a broadcast message or a groupcast message.

In some examples of the method, apparatuses, and non-transitory computer-readable medium described herein, the signaling further indicates a reference signal receive power for the retransmissions of the first message, power control information associated with the retransmissions reflected by the reconfigurable surface, beam steering information associated with the retransmissions reflected by the reconfigurable surface, a quantity of the retransmissions reflected by the reconfigurable surface, or a combination thereof.

Some examples of the method, apparatuses, and non-transitory computer-readable medium described herein may further include operations, features, means, or instructions for reflecting a retransmission of the first message from the second UE to the third UE based on the configuring.

A method for wireless communication at a first UE is described. The method may include detecting, from a second UE, signaling indicating that retransmissions of a first message from a third UE to a fourth UE are reflected by a reconfigurable surface associated with the second UE, selecting a set of sidelink resources for sidelink communications by the first UE based on the detected signaling, and communicating using the selected set of sidelink resources.

An apparatus for wireless communication at a first UE is described. The apparatus may include a processor, memory coupled with the processor, and instructions stored in the memory. The instructions may be executable by the processor to cause the apparatus to detect, from a second UE, signaling indicating that retransmissions of a first message from a third UE to a fourth UE are reflected by a reconfigurable surface associated with the second UE, select a set of sidelink resources for sidelink communications by the first UE based on the detected signaling, and communicate using the selected set of sidelink resources.

Another apparatus for wireless communication at a first UE is described. The apparatus may include means for detecting, from a second UE, signaling indicating that retransmissions of a first message from a third UE to a fourth UE are reflected by a reconfigurable surface associated with the second UE, means for selecting a set of sidelink resources for sidelink communications by the first UE based on the detected signaling, and means for communicating using the selected set of sidelink resources.

A non-transitory computer-readable medium storing code for wireless communication at a first UE is described. The code may include instructions executable by a processor to detect, from a second UE, signaling indicating that retransmissions of a first message from a third UE to a fourth UE are reflected by a reconfigurable surface associated with the second UE, select a set of sidelink resources for sidelink communications by the first UE based on the detected signaling, and communicate using the selected set of sidelink resources.

In some examples of the method, apparatuses, and non-transitory computer-readable medium described herein, the selecting may include operations, features, means, or instructions for selecting the set of sidelink resources that may be distinct from a second set of sidelink resources associated with the retransmissions of the first message based on the detecting.

In some examples of the method, apparatuses, and non-transitory computer-readable medium described herein, detecting, at the first UE, an indication of the first message from the third UE to the fourth UE, estimating a first reference signal receive power associated with the retransmissions of the first message based on detecting the indication of the first message, where detecting the signaling may be based on the estimating, and estimating a second reference signal receive power associated with the retransmissions of the first message greater than the first reference signal receive power based on detecting the signaling indicating that the retransmissions of the first message may be reflected by the reconfigurable surface, where the selecting may be based on estimating the second reference signal receive power.

In some examples of the method, apparatuses, and non-transitory computer-readable medium described herein, detecting the signaling may include operations, features, means, or instructions for detecting the signaling within resources associated with feedback for the first message in a physical sidelink feedback channel.

In some examples of the method, apparatuses, and non-transitory computer-readable medium described herein, detecting the signaling may include operations, features, means, or instructions for detecting a first sequence from a first set of sequences, where the first set of sequences may be unique from a second set of sequences associated with negative acknowledgement signaling and acknowledgement signaling.

In some examples of the method, apparatuses, and non-transitory computer-readable medium described herein, detecting the signaling may include operations, features, means, or instructions for detecting the signaling within resources of a physical sidelink feedback channel that may be nonoverlapping with resources associated with feedback for the first message.

In some examples of the method, apparatuses, and non-transitory computer-readable medium described herein, detecting the signaling may include operations, features, means, or instructions for detecting a first sequence from a first set of sequences associated with negative acknowledgement signaling or a second sequence from a second set of sequences reserved for indicating that retransmissions of the first message may be reflected by the reconfigurable surface.

In some examples of the method, apparatuses, and non-transitory computer-readable medium described herein, detecting the signaling may include operations, features, means, or instructions for detecting the signaling within a broadcast message or a groupcast message.

In some examples of the method, apparatuses, and non-transitory computer-readable medium described herein, the signaling further indicates a reference signal receive power for the retransmissions of the first message, power control information associated with the retransmissions reflected by the reconfigurable surface, beam steering information associated with the retransmissions reflected by the reconfigurable surface, a quantity of the retransmissions reflected by the reconfigurable surface, or a combination thereof.

A method for wireless communications at a first UE including a reconfigurable surface is described. The method may include detecting, from a second UE, a message indicating a request for signal enhancement using a reconfigurable surface, the request associated with a future transmission by the second UE, determining to perform the signal enhancement for the future transmission by the second UE based on detecting the message, and configuring the reconfigurable surface at the first UE for reflecting the future transmission by the second UE based on the determining.

An apparatus for wireless communications at a first UE including a reconfigurable surface is described. The apparatus may include a processor, memory coupled with the processor, and instructions stored in the memory. The instructions may be executable by the processor to cause the apparatus to detect, from a second UE, a message indicating a request for signal enhancement using a reconfigurable surface, the request associated with a future transmission by the second UE, determine to perform the signal enhancement for the future transmission by the second UE based on detecting the message, and configure the reconfigurable surface at the first UE for reflecting the future transmission by the second UE based on the determining.

Another apparatus for wireless communications at a first UE including a reconfigurable surface is described. The apparatus may include means for detecting, from a second UE, a message indicating a request for signal enhancement using a reconfigurable surface, the request associated with a future transmission by the second UE, means for determining to perform the signal enhancement for the future transmission by the second UE based on detecting the message, and means for configuring the reconfigurable surface at the first UE for reflecting the future transmission by the second UE based on the determining.

A non-transitory computer-readable medium storing code for wireless communications at a first UE including a reconfigurable surface is described. The code may include instructions executable by a processor to detect, from a second UE, a message indicating a request for signal enhancement using a reconfigurable surface, the request associated with a future transmission by the second UE, determine to perform the signal enhancement for the future transmission by the second UE based on detecting the message, and configure the reconfigurable surface at the first UE for reflecting the future transmission by the second UE based on the determining.

Some examples of the method, apparatuses, and non-transitory computer-readable medium described herein may further include operations, features, means, or instructions for transmitting, to the second UE, signaling indicating the performing of the signal enhancement at the first UE for the future transmission by the second UE, where the configuring may be based on transmitting the signaling.

In some examples of the method, apparatuses, and non-transitory computer-readable medium described herein, transmitting the signaling may include operations, features, means, or instructions for transmitting the signaling via a physical sidelink feedback channel using resources associated with the message.

In some examples of the method, apparatuses, and non-transitory computer-readable medium described herein, transmitting the signaling may include operations, features, means, or instructions for transmitting the signaling via a physical sidelink shared channel.

In some examples of the method, apparatuses, and non-transitory computer-readable medium described herein, the signaling further indicates one or more transmissions parameters for the future transmission by the second UE.

In some examples of the method, apparatuses, and non-transitory computer-readable medium described herein, receiving the message may include operations, features, means, or instructions for receiving the message via sidelink control information or via a medium access control-control element.

In some examples of the method, apparatuses, and non-transitory computer-readable medium described herein, the message further indicates resources associated with the future transmission, a location associated with a target UE for the future transmission, an identifier associated with a group of UEs associated with the future transmission, or a combination thereof.

A method for wireless communications at a first UE is described. The method may include determining that a channel condition for sidelink communications between the first UE and a second UE falls below a quality threshold, transmitting, based on the determining, a first message including a request for signal enhancement using a reconfigurable surface, the request associated with a second message transmitted by the first UE subsequent to transmitting the first message, and transmitting the second message based on transmitting the second message.

An apparatus for wireless communications at a first UE is described. The apparatus may include a processor, memory coupled with the processor, and instructions stored in the memory. The instructions may be executable by the processor to cause the apparatus to determine that a channel condition for sidelink communications between the first UE and a second UE falls below a quality threshold, transmit, based on the determining, a first message including a request for signal enhancement using a reconfigurable surface, the request associated with a second message transmitted by the first UE subsequent to transmitting the first message, and transmit the second message based on transmitting the second message.

Another apparatus for wireless communications at a first UE is described. The apparatus may include means for determining that a channel condition for sidelink communications between the first UE and a second UE falls below a quality threshold, means for transmitting, based on the determining, a first message including a request for signal enhancement using a reconfigurable surface, the request associated with a second message transmitted by the first UE subsequent to transmitting the first message, and means for transmitting the second message based on transmitting the second message.

A non-transitory computer-readable medium storing code for wireless communications at a first UE is described. The code may include instructions executable by a processor to determine that a channel condition for sidelink communications between the first UE and a second UE falls below a quality threshold, transmit, based on the determining, a first message including a request for signal enhancement using a reconfigurable surface, the request associated with a second message transmitted by the first UE subsequent to transmitting the first message, and transmit the second message based on transmitting the second message.

Some examples of the method, apparatuses, and non-transitory computer-readable medium described herein may further include operations, features, means, or instructions for receiving, from a third UE, signaling indicating that the third UE may be performing the signal enhancement for the second message, where transmitting the second message may be based on receiving the signaling.

In some examples of the method, apparatuses, and non-transitory computer-readable medium described herein, receiving the signaling may include operations, features, means, or instructions for receiving the signaling via a physical sidelink feedback channel using resources associated with the first message.

In some examples of the method, apparatuses, and non-transitory computer-readable medium described herein, receiving the signaling may include operations, features, means, or instructions for receiving the signaling via a physical sidelink shared channel.

In some examples of the method, apparatuses, and non-transitory computer-readable medium described herein, the signaling further indicates one or more transmissions parameters for the second message by the first UE.

In some examples of the method, apparatuses, and non-transitory computer-readable medium described herein, transmitting the first message may include operations, features, means, or instructions for transmitting the first message via sidelink control information or via a medium access control-control element.

In some examples of the method, apparatuses, and non-transitory computer-readable medium described herein, the first message further indicates resources associated with the second message, a location associated with the second UE, an identifier associated with a group of UEs including at least the second UE, or a combination thereof.

DETAILED DESCRIPTION

Figure 1:
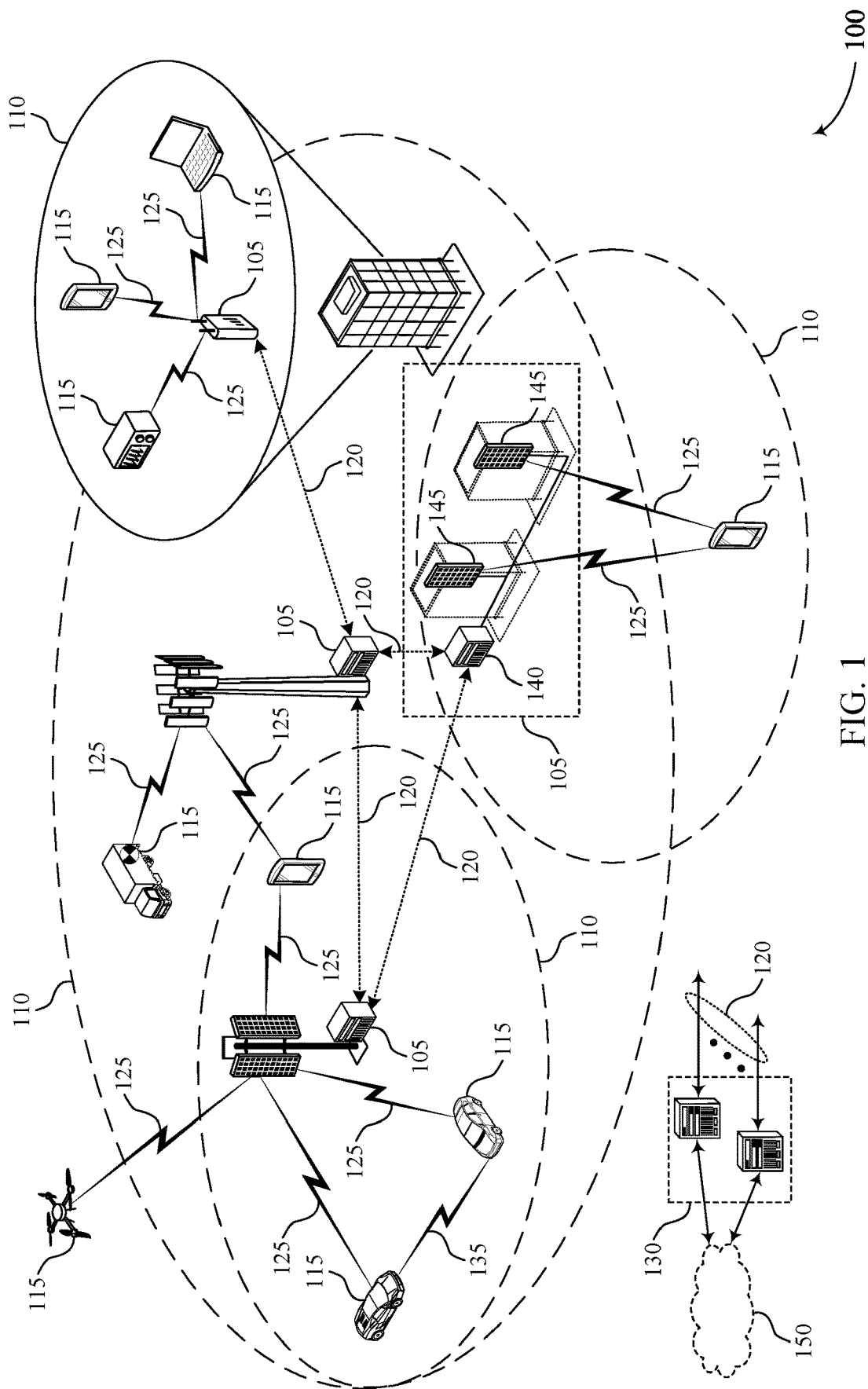
FIGS. 1 through 3 illustrate examples of wireless communications systems that support reconfigurable surfaces for sidelink communications in accordance with aspects of the present disclosure.

Some wireless communications systems may support sidelink communications between user equipments (UEs). However, physical proximity or environmental factors (e.g., interference, blockage) may impair sidelink communications between UEs. In some cases, one or more UEs may be unable to successfully transmit information via a line-of-sight (LOS) path. For example, an LOS path (e.g., a straight line) between two UEs may be obstructed. In such cases, a UE may attempt to transmit information to another UE by reflecting a transmission off of a reflective or semi-reflective object. In some cases, an angle of reflection of a reflected transmission may be equal to an angle of incidence (e.g., the angle of reflection may not be configurable). In some cases, the reflective object may attenuate a transmission that it reflects, and/or a path length for a reflected transmission may be longer than a path length for an LOS transmission. As a result, a reflected transmission may have a lower signal strength than an LOS transmission.

Some wireless communications systems may include reconfigurable intelligent surfaces (RISs) to facilitate transmissions between base stations and UEs or between two UEs for sidelink communications. An RIS may include one or more reflective, electrically-controllable elements. In some cases, an RIS may be self-contained (e.g., a standalone RIS) or may be associated with (e.g., paired with) some other wireless device (e.g., an RIS-enabled UE). In some cases, an RIS-enabled UE may configure one or more reflection coefficients (e.g., associated with an RIS) to reflect sidelink transmissions or retransmissions in a specific direction. For example, an RIS-enabled UE may configure an RIS to redirect a beamformed communication in a direction of another UE based on a location of the receiving UE. In some cases, beamformed communications or transmissions reflected by an RIS may be referred to RIS-aided communications or RIS-aided transmissions. An RIS may improve a signal quality and/or increase a signal power of sidelink transmissions. However, RIS-aided sidelink transmissions (e.g., with increased signal quality and/or power) may adversely affect other UEs within a wireless communication system. For example, an RIS may introduce interference due to increased signal power of reflected transmissions.

For example, a UE may reserve time-frequency resources based on power measurements and sensing (e.g., based on reference signal received power (RSRP) measurements). That is, the UE may sense a channel and receive sidelink control information (SCI) from other UEs. The UE may measure RSRPs for each SCI transmission it receives and may determine if RSRPs exceed a threshold RSRP. The UE may determine that time-frequency resources are reserved if an RSRP of an SCI transmission exceeds a threshold RSRP. Accordingly, the UE may exclude (e.g., determine not to use) the time-frequency resources (e.g., to minimize or eliminate interference). In some cases, a UE may measure an RSRP of a SCI transmission (e.g., that is not reflected by an RIS) and determine that the RSRP is below a threshold RSRP. The UE may determine that the time-frequency resource is available (e.g., not reserved) based on the RSRP being below the threshold RSRP. However, other transmissions associated with the SCI transmission (e.g., retransmissions) may be reflected by an RIS (e.g., associated with an RIS-enabled UE) to improve the signal quality, the signal power, or both. As a result, the UE may erroneously determine to use time-frequency resources that overlap with time-frequency resources for RIS-aided sidelink retransmissions (e.g., where the RIS-aided sidelink retransmissions are associated with an RSRP measured by the UE that exceeds the threshold RSRP).

Various aspects of the present disclosure relate to improved techniques for transmitting RIS-aided sidelink communications. In some examples, a first UE (e.g., a RIS-enabled UE) may detect an indication of a first message transmitted over sidelink resources between a second UE and a third UE. The first UE may transmit signaling (e.g., unicast, multicast, or broadcast signaling) indicating that retransmissions of the first message are reflected by an RIS associated with the first UE. Accordingly, the RIS may reflect the retransmissions and other UEs (e.g., a fourth UE, a fifth UE) may determine time-frequency resource availability based on the signaling indicating that retransmissions of the first message are reflected by the RIS associated with the first UE. For example, a fourth UE may avoid communicating with a fifth UE using time-frequency resources that overlap with time-frequency resources for RIS-aided sidelink communications between the second and the third UE.

In some other cases, a first UE including an RIS may receive, from a second UE, a pre-transmission packet including a message indicating a request that one or more future transmissions be reflected by the RIS (e.g., a request for RIS enhancement). Specifically, the second UE may not transmit sidelink communications to a third UE prior to transmitting the pre-transmission packet. The first UE may determine to reflect future transmissions based on receiving the pre-transmission packet and may configure the RIS based on the determination. In some cases, the second UE transmitting a pre-transmission packet may ensure that all sidelink transmissions are RIS-aided and consequently have the same or similar RSRPs. As a result, additional UEs within the wireless communications system (e.g., a fourth UE, a fifth UE) may select time-frequency resources that do not overlap with time-frequency resources for RIS-aided sidelink communications between the second UE and the third UE.

Aspects of the disclosure are initially described in the context of wireless communications systems. Aspects of the disclosure are additionally described in the context of transmission schemes and process flows. Aspects of the disclosure are further illustrated by and described with reference to apparatus diagrams, system diagrams, and flowcharts that relate to reconfigurable surfaces for sidelink communications. Although the disclosure may generally describe examples with reference to RIS-enabled UEs, the techniques described herein may be applicable to any system or device including one or more RIS elements.

FIG. 1 illustrates an example of a wireless communications system 100 that supports reconfigurable surfaces for sidelink communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the medium access control (MAC) layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Wireless communications system 100 may include RISs to facilitate transmissions between base stations 105 and UEs 115 or between two UEs 115 for sidelink communications. An RIS may include one or more reflective, electrically-controllable elements. In some cases, an RIS may be self-contained (e.g., a standalone RIS) or may be associated with (e.g., paired with) some other wireless device (e.g., an RIS-enabled UE 115). In some cases, an RIS-enabled UE 115 may configure one or more reflection coefficients (e.g., associated with an RIS) to reflect sidelink transmissions or retransmissions in a specific direction. For example, an RIS-enabled UE 115 may configure an RIS to redirect a beamformed communication in a direction of another UE 115 based on a location of the receiving UE 115. In some cases, beamformed communications or transmissions reflected by an RIS may be referred to RIS-aided communications or RIS-aided transmissions. An RIS may improve a signal quality and/or increase a signal power of sidelink transmissions. However, RIS-aided sidelink transmissions (e.g., with increased signal quality and/or power) may adversely affect other UEs 115 within the wireless communications system 100. For example, an RIS may introduce interference due to increased signal power of reflected transmissions (e.g., due to a lack of coordination between UEs 115 in the wireless communications system 100).

In some examples, a first UE 115 (e.g., a RIS-enabled UE 115) may detect an indication of a first message transmitted over sidelink resources between a second UE 115 and a third UE 115. The first UE 115 may transmit signaling (e.g., unicast, multicast, or broadcast signaling) indicating that retransmissions of the first message are reflected by an RIS associated with the first UE 115. Accordingly, the RIS may reflect the retransmissions and other UEs 115 (e.g., a fourth UE 115, a fifth UE 115) may determine time-frequency resource availability based on the signaling indicating that retransmissions of the first message are reflected by the RIS associated with the first UE 115. For example, a fourth UE 115 may avoid communicating with a fifth UE 115 using time-frequency resources that overlap with time-frequency resources for RIS-aided sidelink communications between the second and the third UE 115.

In some other cases, a first UE 115 including an RIS may receive, from a second UE 115, a pre-transmission packet including a message indicating a request that one or more future transmissions be reflected by the RIS (e.g., a request for RIS enhancement). Specifically, the second UE 115 may not transmit sidelink communications to a third UE 115 prior to transmitting the pre-transmission packet. The first UE 115 may determine to reflect future transmissions based on receiving the pre-transmission packet and may configure the RIS based on the determination. In some cases, the second UE 115 transmitting a pre-transmission packet may ensure that all sidelink transmissions are RIS-aided and consequently have the same or similar RSRPs. As a result, additional UEs 115 within the wireless communications system (e.g., a fourth UE 115, a fifth UE 115) may select time-frequency resources that do not overlap with time-frequency resources for RIS-aided sidelink communications between the second UE 115 and the third UE 115.

Figure 2:
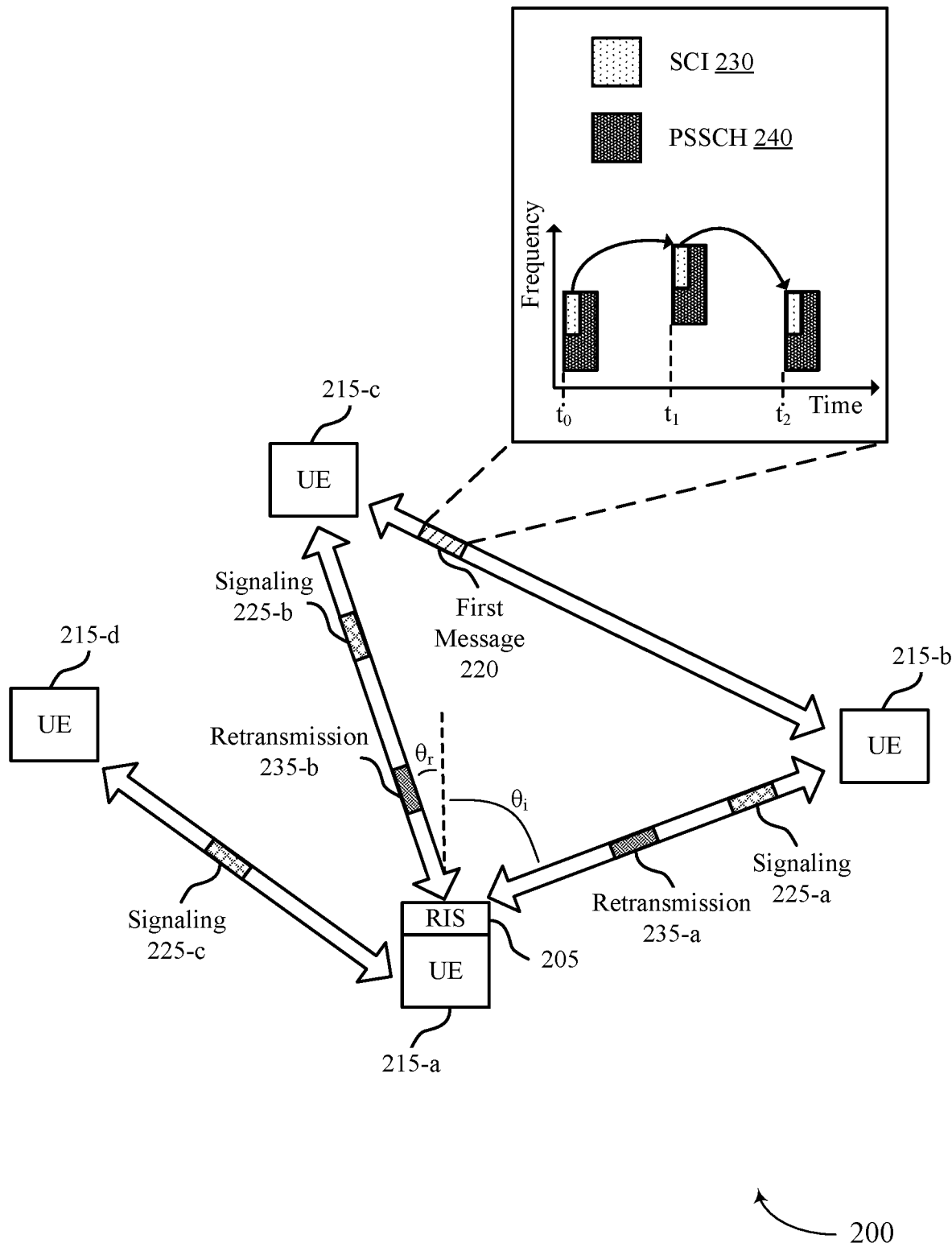

FIG. 2 illustrates an example of a wireless communications system 200 that supports reconfigurable surfaces for sidelink communications in accordance with aspects of the present disclosure. The wireless communications system 200 may implement aspects of the wireless communications system 100. For example, the wireless communications system 200 may include UE 215-a, UE 215-b, UE 215-c, and UE 215-d which may be examples of corresponding UEs 115 as described with reference to FIG. 1. As illustrated in FIG. 2, UE 215-a may be an example of an RIS-enabled UE. In some examples, UEs 215 may communicate via sidelink communications which may include beamformed communications.

UE 215-a may be located within a proximity of UE 215-b and UE 215-c, such that transmissions between UE 215-b and UE 215-c may be detected by UE 215-a. In some examples, first message 220 may be a transmit diversity beamformed transmission. In some examples, UE 215-b, UE 215-c, and UE 215-d may be aware that there are RIS-enabled UEs (e.g., UE 215-a) within wireless communications system 200. That is, the UEs 215 may receive signaling from a base station or another UE 215 indicating a presence of an RIS-enabled UE 215 within the wireless communications system 200. However, UE 215-b, UE 215-c, and UE 215-d may not have established dedicated communication links with UE 215-a (e.g., the RIS-enabled UE). Additionally or alternatively, UE 215-b, UE 215-c, and UE 215-d may not have information related to UE 215-a.

A UE 215 may contend for time and frequency resources associated with a sidelink channel. For example, a UE 215 may operate in a sidelink Mode 2, where time and frequency resources for sidelink communications may be reserved by UEs 215. In some cases, a UE 215 may select (e.g., determine to use or reserve) time and frequency resources for communications based on power measurements (e.g., RSRP) and channel sensing. That is, a UE 215 may perform channel measurements to sense a channel for reservations (e.g., a sidelink channel) and exclude resources it senses to be reserved based on an RSRP of a received SCI (e.g., SCI 230). For example, UE 215-d may sense a channel and measure an RSRP associated with SCI 230. UE 215-d may determine that time and frequency resources associated with SCI 230 are reserved (e.g., unavailable) if the RSRP is above a threshold RSRP. In some examples, the RSRP may be above the threshold RSRP and UE 215-d may determine not to use time and frequency resources associated with SCI 230, which may reduce or eliminate interference associated with future sidelink communications. For example, sidelink communications transmitted by UE 215-d may not interfere with first message 220, retransmissions 235, or other transmissions associated with UE 215-a, UE 215-b, and UE 215-c.

In some examples, UE 215-b may sense a sidelink channel. UE 215-b may select a resource for first message 220 and may select additional resources for potential retransmissions 235 based on sensing information associated with the sidelink channel (e.g., based on sensing RSRPs associated with the sidelink channel). Here, UE 215-b may select time and frequency resources for retransmissions 235 associated with a physical sidelink shared channel (PSSCH) 240. In some examples, UE 215-b may transmit first message 220 on PSSCH 240 at a first time (e.g., $t_0$). UE 215-b may select an occasion associated with PSSCH 240 at a second time (e.g., $t_1$), and an occasion associated with PSSCH 240 at a third time (e.g., $t_2$) for retransmissions 235 (e.g., including the retransmissions 235-a and 235-b at time $t_1$).

For example, UE 215-b may transmit first message 220 to UE 215-c via an LOS path. However, the LOS path between UE 215-b and UE 215-c may be obstructed or may degrade (e.g., after the transmission of first message 220). For example, the position or location of UE 215-c may change, which may degrade the communication channel between UE 215-b and UE 215-c. In some examples, the LOS path between UE 215-b and UE 215-c may degrade, and UE 215-b may establish a weak non-LOS link to UE 215-c. Here, transmissions between UE 215-b and UE 215-c may be reflected (e.g., off of obstructions or non-configurable surfaces). In some cases, transmissions associated with the non-LOS link between UE 215-b and UE 215-c may have low RSRPs (e.g., when compared to transmissions associated with a LOS link between UEs 215). Here, UE 215-d may measure an RSRP associated with transmissions between UE 215-b and UE 215-c (e.g. via the non-LOS link) and determine that the RSRP associated with the transmissions falls below a threshold RSRP. Accordingly, UE 215-d may determine that time-frequency resources associated with retransmissions 235 of the first message 220 (e.g., at times to and $t_1$) between UE 215-b and UE 215-c are available. However, UE 215-b may transmit the retransmission 235-a, which may generate retransmission 235-b using RIS 205 (e.g., the retransmission 235-b may be a reflection of retransmission 235-a). As a result, retransmission 235-b may interfere with sidelink communications associated with UE 215-d as the retransmission 235-b may overlap with time and frequency resources selected by the UE 215-d for other communications.

The UE 215-a may determine to reflect the retransmission 235-a of the first message 220 based on detecting the first message 220. That is, the first message 220 may include SCI 230 and data transmitted via a PSSCH 240. In some cases, SCI 230 may include a zone ID of UE 215-b, a zone ID of UE 215-c, group ID information (e.g., associated with one or more UEs 215), and range requirement information (e.g., associated with data transmitted via the PSSCH 240 in the first message 220). Here, the UE 215-a may determine, based on information within the SCI 230 of the first message and sensor and map information stored at the UE 215-a, that the UE 215-a may configure the RIS 205 to increase a signal quality (e.g., a transmission power) associated with retransmissions 235 of the first message 220.

In some other cases, UE 215-a may determine to reflect retransmissions 235 of the first message 220 based on detecting an enhanced SCI 230 (or an enhanced medium access control-control element (MAC-CE)) within the first message 220. The enhanced SCI 230 or enhanced MAC-CE may include location information of one or multiple UEs 215 (e.g., UE 215-c and UE 215-d), which may be indicated using a zone identifier of the UE 215 or using absolute coordinates of the UEs 215. For a unicast transmission, the enhanced SCI-2 may indicate the zone identifier of the receiver or the unicast peer (e.g., UE 215-c). For a groupcast transmission, a transmitting UE 215 (e.g., UE 215-b) may determine a set of group members (e.g., UEs 215) with poor links and indicate zone identifiers for the group members. In some examples, the transmitting UE 215 (e.g., UE 215-b) may additionally or alternatively indicate a priority for each UE 215 or groups of UEs 215 if multiple zone identifiers are present. RIS 205 or RIS-enabled UE 215-a may prioritize retransmissions 235 based on indicated priority. That is, the UE 215-a may determine to reflect retransmissions 235 of the first message 220 based on the enhanced SCI 230 or MAC-CE indicating that the first message 220 has a higher priority when compared to priorities associated with other messages.

UE 215-a may then autonomously determine reflection coefficients for reflecting the retransmissions 235 towards the intended recipient (e.g., UE 215-c). For example, the UE 215-a may set reflection coefficients of the RIS 205 to direct the retransmission 235-a arriving at the RIS 205 at an angle of incident $\theta_i$ towards the UE 215-c at an angle of reflection $\theta_r$. The UE 215-a may determine the reflection coefficients based on information contained with the SCI 230, information contained within a MAC-CE of the first message 220, internal sensor and map information stored at the UE 215-a, or a combination thereof. Additionally, when the enhanced SCI 230 or enhanced MAC-CE includes a set of location information (e.g., for UE 215-c and UE 215-d), UE 215-a may determine the one or multiple reflection coefficients based on the proximity of UE 215-c to other UEs 215, a location of the UE 215-c and UE 215-b, and an indicated priority associated with the first message 220.

Based on determining to reflect retransmissions 235 of the first message 220-a, the UE 215-a may transmit signaling 225 indicating that retransmissions 235 of first message 220 are reflected by RIS 205. In some examples, UE 215-a may transmit signaling 225 over a physical sidelink feedback channel (PSFCH) using a sequence. Additionally or alternatively, UE 215-a may transmit signaling 225 over a PSFCH using a message. UE 215-a may transmit signaling 225 via unicast, broadcast, and/or groupcast communications. For example, UE 215-a may transmit signaling 225-a to UE 215-b via unicast communications. In some other examples, UE 215-a may transmit signaling 225-a, signaling 225-b, and signaling 225-c to UE 215-b, UE 215-c, and UE 215-d, respectively, via multicast communications. Additionally or alternatively, UE 215-a may transmit signaling 225-a via broadcast communications that may be received by any UE within a coverage area. In some cases, UEs 215 (e.g., a legacy UE 215) may disregard feedback signaling 225 when received over PSFCH or PSSCH.

Signaling 225 may include the indication that retransmissions 235 are reflected by RIS 205. Additionally, signaling 225 may include information related to power control, beam steering, and a quantity of retransmissions 235. Additionally or alternatively, signaling 225 may include an indication of a margin for resource exclusion RSRP. For example, UE 215-a may transmit signaling 225 indicating for a margin for resource exclusion RSRP (e.g., an updated RSRP threshold) that prevents UEs 215 from using time and frequency resources that overlap with time and frequency resources for retransmissions 235. Additionally or alternatively, UE 215-a may indicate an RSRP for resource exclusion in the signaling 225.

UEs 215 that detect the signaling 225 may update resource selection for communications (e.g., based on resource exclusion RSRP). For example, UE 215-d may decode SCI 230 transmitted in first message 220. That is, while UE 215-b may not transmit first message 220 directly to UE 215-d, UE 215-d may detect (e.g., receive) first message 220. Additionally, UE 215-d may receive signaling 225-c from UE 215-a. Signaling 225-c may include an indication that retransmissions 235 are reflected by RIS 205. In response to receiving signaling 225, UE 215-d may apply a pre-configured protection to (e.g., UE 215-d may exclude and determine not to use) time and frequency resources indicated in SCI 230 or time and frequency resources within a configured threshold of the resources indicated in SCI 230. In some other examples, UE 215-d may apply additional protection (e.g., UE 215-d may exclude and determine not to use) time and frequency resources based on an RSRP of a previously detected SCI 230, a power of a PSSCH 240, and any location or sensor information associated with UE 215-a and UE 215-b. In some other examples, UE 215-d may decode both a first and a second SCI 230, and may enhance time and frequency resource protection based on location information indicated in the second SCI 230. Thus, UE 215-d may decode SCI 230 transmitted at $t_0$, SCI 230 transmitted at $t_1$, and signaling 225 and may determine to exclude time and frequency resources for communications.

Figure 3:
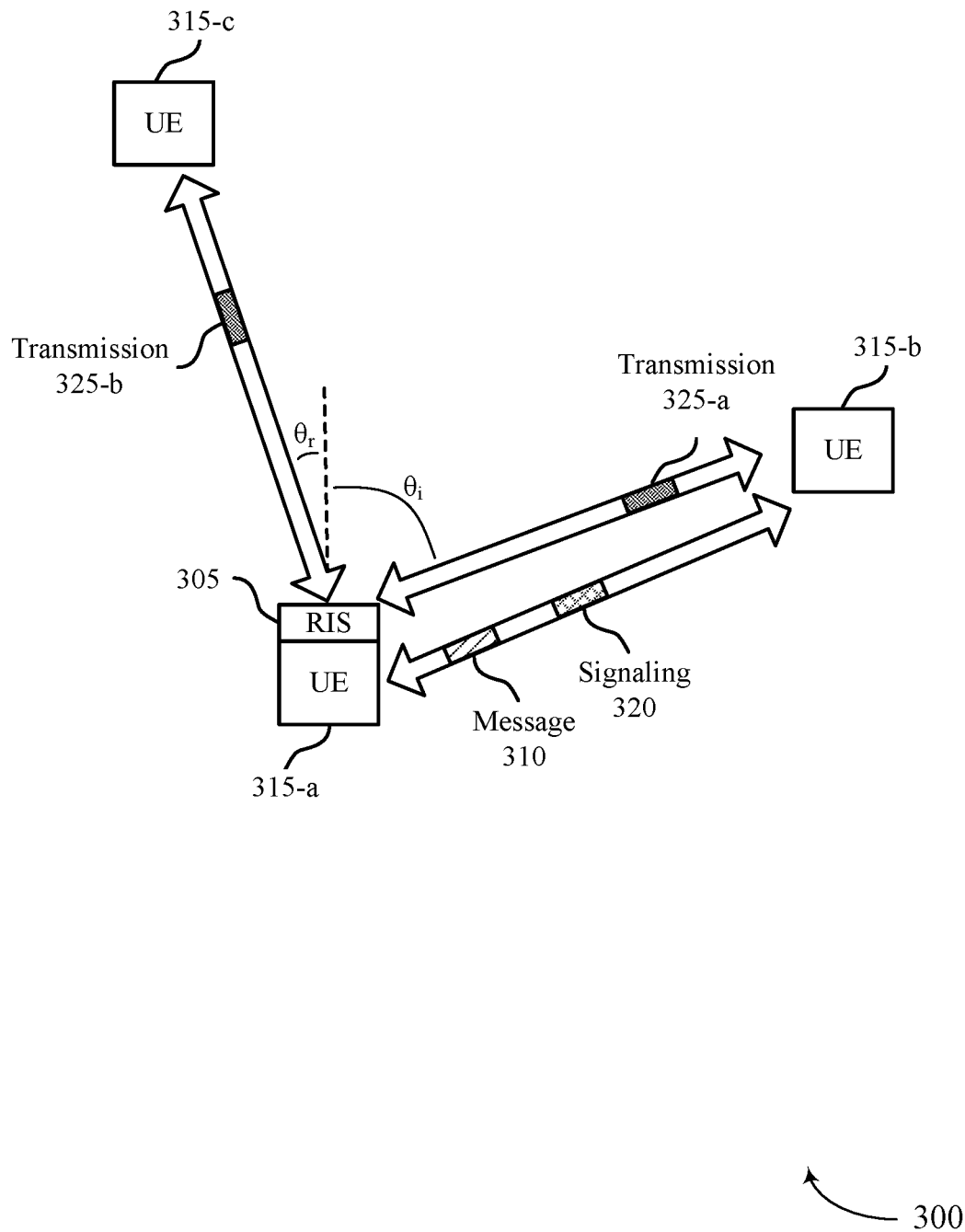

FIG. 3 illustrates an example of a wireless communications system 300 that supports reconfigurable surfaces for sidelink communications in accordance with aspects of the present disclosure. The wireless communications system 300 may implement aspects of the wireless communications system 100. For example, the wireless communications system 300 may include UE 315-a, UE 315-b, UE 315-c, and UE 315-d which may be examples of corresponding UEs 115 as described with reference to FIG. 1. As illustrated in FIG. 3, UE 315-a may be an example of an RIS-enabled UE. In some examples, UEs 315 may communicate via sidelink communications which may include beamformed communications.

UE 315-b and UE 315-c may be aware that there are RIS-enabled UEs 315 within wireless communications system 300 (e.g., based on signaling from another UE 315 in the wireless communications system 300, based on signaling from a base station). Additionally, UE 315-b and UE 315-c may not have established dedicated communication links with UE 315-a (e.g., the RIS-enabled UE).

A UE 315 may determine that poor link conditions exist between the UE 315 and some other UE 315. For example, UE 315-b may determine that a sidelink channel between UE 315-b and UE 315-c has degraded. In some cases, a UE 315 may determine that poor link conditions exist based on measurement reports (e.g., based on radio resource control (RRC) measurement reports). For example, UE 315-b may receive an RRC measurement report from UE 315-c via a unicast link, where the RRC measurement report indicates that the sidelink between the UEs 315-b and 315-c has degraded (e.g., below a signal quality threshold). In some other cases, a UE 315 may determine that poor link conditions exist based on a negative acknowledgement (NACK) received for previous transmissions. For example, UE 315-b may receive a NACK message from UE 315-c indicating that a prior transmission (e.g., from UE 315-b to UE 315-c) was not decoded by UE 315-c. Additionally or alternatively, a UE 315 may determine that poor link conditions exist based on sensor information and/or map information. That is, UE 315-b may determine that poor link conditions exist based on a blockage between UE 315-b and UE 315-c.

Based on determining that poor link conditions exist between UE 315-b and UE 315-c, UE 315-b may transmit a pre-transmission message to RIS-enabled UEs within the wireless communications system 300 indicating a request for RIS enhancement associated with future transmission 325 by the UE 315-b. For example, UE 315-b may transmit message 310 to UE 315-a over a dedicated channel (e.g., part of a default configuration) or over contention-based resources. Message 310 may include an SCI or a MAC-CE indicating that message 310 is a pre-transmission message for RIS configuration. For example, the message 310 may indicate that message 310 precedes future transmission 325-a and future transmission 325-b. The indication may additionally or alternatively indicate that message 310 is for configuration of RIS 305 to reflect the future transmission 325-a towards the UE 315-c. In some instances, UE 315-b may indicate the request for RIS enhancement within first message 310 via a bit in the SCI or a MAC-CE. Additionally or alternatively, UE 315-b may indicate the request for RIS enhancement within the first message 310 using a reserved application identifier, a packet identifier, or both.

The pre-transmission message (e.g., message 310) may include reservation information (e.g., indicating time and frequency resources) for one or more future transmissions 325. In some examples, the SCI or MAC-CE included in message 310 may include information associated with a targeted location. For example, the SCI or MAC-CE may indicate that UE 315-b may intend to transmit future transmissions 325 to a targeted location associated with UE 315-c. The SCI or MAC-CE may additionally include information associated with group identifiers (e.g., indicating a group of UEs 315 including UE 315-c). The information included in the SCI or MAC-CE may be indicated using a list of UE identifiers (e.g., layer 2 ID) and/or a list of zone identifiers or positioning coordinates.

Based on receiving the message 310 (e.g., the pre-transmission message), UE 315-a may determine if it can steer the transmitted signal in a direction associated with a receiving UE 315. For example, UE 315-a may receive message 310 and may determine if RIS 305 may be configured (e.g., based on a capability of RIS 305) to reflect future transmissions 325-a received from UE 315-b to UE 315-c (e.g., via transmission 325-b). That is, UE 315-a may determine if the RIS 305 may be configured to reflect a transmission 325-a arriving at the RIS 305 at an angle of incident $\theta_i$ towards the UE 315-c at an angle of reflection $\theta_r$.

In some examples where UE 315-a determines that it can steer the transmission 325-a towards UE 315-c, UE 315-a may optionally transmit signaling 320 to UE 315-b indicating that UE 315-a will reflect the transmission 325-a using RIS 305. In some cases, UE 315-a may transmit signaling 320 using PSFCH resources. Here, UE 315-a may use PSFCH resources that overlap with acknowledgement (ACK) and NACK resources associated with message 310 using sequences that are different from ACK and NACK sequences (e.g., that are orthogonal to ACK and NACK sequences). Additionally or alternatively, UE 315-*a* may use PSFCH resources that are unused by ACK and NACK resources associated with message 310. In this case, signaling 320 may include ACK or NACK messages, where an ACK indicates that a pre-transmission request was accepted by UE 315-*a* and a NACK may indicate that a pre-transmission request was rejected by UE 315-*a*.

In some other examples, UE 315-*a* may transmit signaling 320 using resources other than PSFCH resources. For example, UE 315-*a* may broadcast or groupcast a message including signaling 320. The message may include an indication of whether or not a pre-transmission request was accepted or rejection. For example, the message may include an indication of whether or not UE 315-*a* may reflect future transmissions 325. Additionally or alternatively, the message may include information for UE 315-*b* to change transmission parameters. For example, the message may indicate that transmission parameters at UE 315-*b* should be updated. Transmission parameters may include transmission power and/or a quantity of transmissions.

In some examples, UE 315-*a* may forward reservation information received from UE 315-*b*. For example, UE 315-*a* may transmit, to UE 315-*c*, reservation information, which may be related to time-frequency resource reservation for future transmissions 325. In some examples, reservation information may include information to enhance protection for indicated time-frequency resources. For example, reservation information may include information associated with RSRP. In some examples, UE 315-*a* may receive message 310 from UE 315-*b* and may not transmit feedback to UE 315-*b*. However, UE 315-*a* may configure RIS 305 to reflect future transmissions 325. For example, UE 315-*a* may set steer parameters for RIS 305 according to information derived from message 310. In some examples, a UE (e.g., a legacy UE) may interpret messages (e.g., message 310) and feedback as part of SL communication between UEs and determine to disregard the content of messages and feedback.

Based on determining to perform RIS enhancement for transmission 325 (e.g., after receiving message 310 requesting for UE 315-*a* to perform the RIS enhancement), UE 315-*a* may configure the RIS 305 to reflect transmission 325-*a* towards UE 315-*c*. Then, UE 315-*b* may transmit transmission 325-*a* and RIS 305 may reflect transmission 325-*b* towards UE 315-*c*. Here, a signal quality associated with transmission 325-*b* received by UE 315-*c* (e.g., based on RIS 305 reflecting transmission 325-*a*) may be associated with a greater signal quality when compared to a signal quality associated with a transmission 325 received at UE 315-*c* from UE 315-*b* that was not reflected by an RIS 305.

Figure 4A:
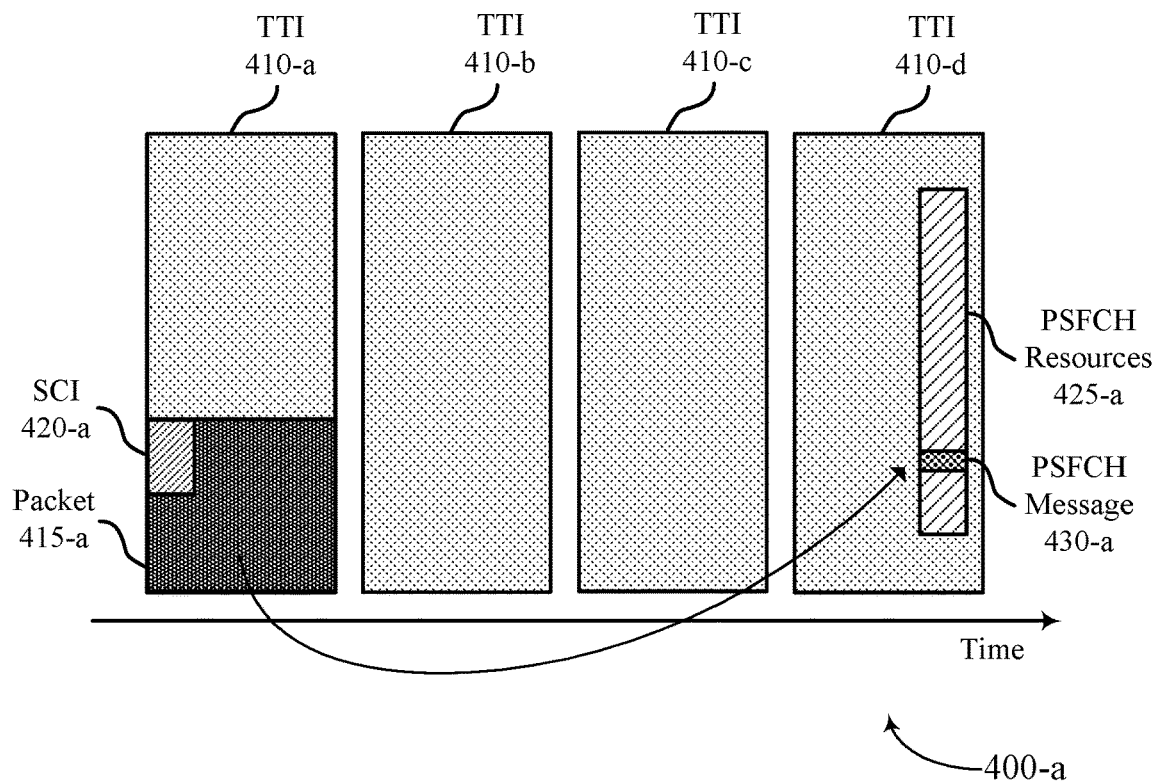
FIGS. 4A and 4B illustrate examples of transmission schemes that support reconfigurable surfaces for sidelink communications in accordance with aspects of the present disclosure.
Figure 4B:
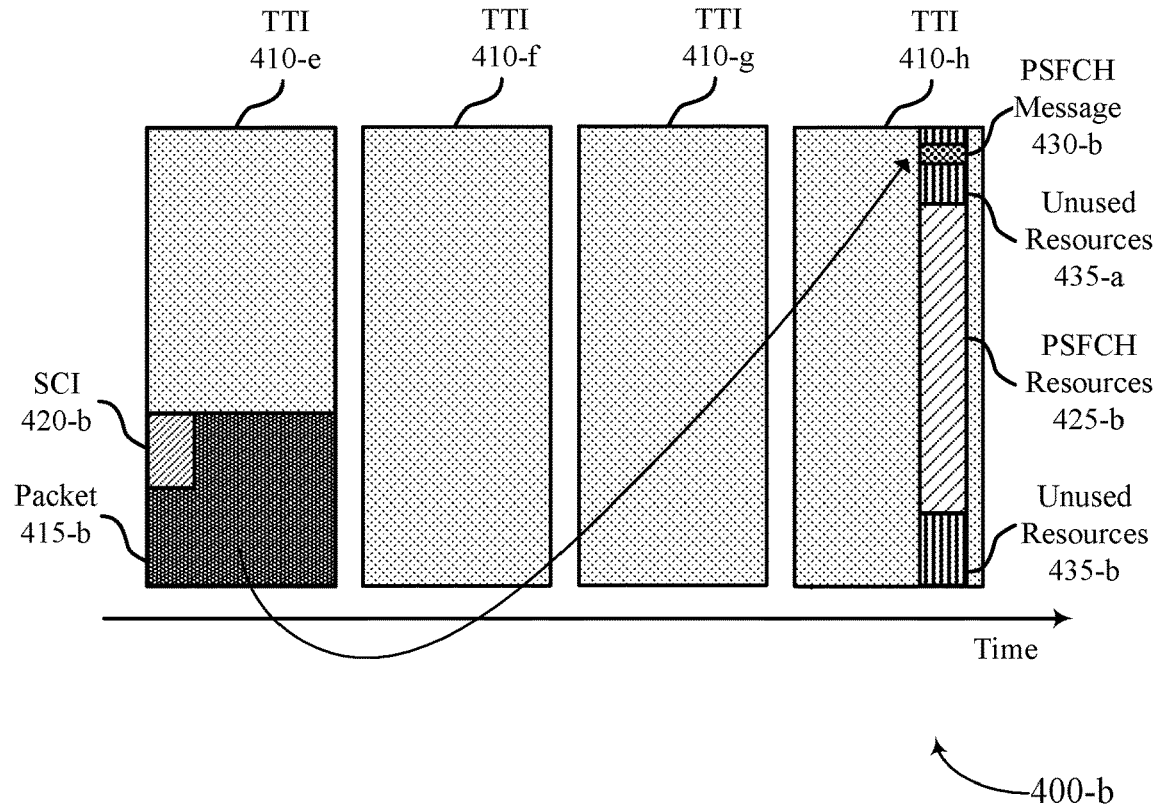

FIGS. 4A and 4B illustrate examples of transmission schemes 400 that supports reconfigurable surfaces for sidelink communications in accordance with aspects of the present disclosure. In some examples, transmission schemes 400 may implement aspects of wireless communications system 100, wireless communications system 200, or wireless communications system 300. For example, transmission schemes 400 may illustrate resource allocation for UEs as described with reference to FIGS. 1 through 3.

The transmission schemes 400 may include transmission time intervals (TTIs) 410, which may be examples of scheduling units for a wireless communications system. For example, TTIs 410 may occur periodically or according to a predefined sequence. In some examples, packets 415 may be transmitted within a first TTI 410 (e.g., TTI 410-*a*, TTI 410-*e*) and may be examples of data packets communicated from a first UE to a second UE via a sidelink. The packets 415 may additionally include control information (e.g., SCIs 420, a MAC-CE), which may include an indication of a first message, coefficients for configuring a reconfigurable surface, a zone identifier of a UE, an identifier of a UE, a location of a UE, a group identifier associated with one or more UEs, a range associated with a first message, a priority associated with UEs, and a priority associated with one or more sets of UEs. In some examples, a RIS-enabled UE may transmit SCI 420 based on determining that a beneficial reflection is possible for a transmission.

A UE that is associated with an RIS (e.g., an RIS-enabled UE as described herein) may use a transmission scheme 400 to transmit signaling indicating that the RIS-enabled UE is to perform RIS enhancement for a future transmission. That is, the RIS-enabled UE may detect a message from a second UE within the packet 415 (e.g., based on receiving the SCI 420) indicating a request for RIS enhancement associated with a future transmission by the second UE (e.g., as described with reference to FIG. 3). The RIS-enabled UE may, in response to detecting the message associated with the packet 415 indicating the request, transmit signaling (e.g., via one or more PSFCH resources 425 in a PSFCH message 430) indicating whether the RIS-enabled UE will perform RIS enhancement for the future transmission.

FIG. 4A may illustrate a transmission scheme 400-*a* where the RIS-enabled UE transmits signaling within PSFCH message 430-*a* indicating whether the RIS-enabled UE will perform RIS enhancement for the future transmission using PSFCH resources 425-*a* associated with the first message (e.g., detected by the RIS-enabled UE and associated with the packet 415-*a*). The RIS-enabled UE may determine the PSFCH occasion (e.g., from PSFCH resources 425-*a*) based on SCI 420-*a* of packet 415-*a*. PSFCH resources 425-*a* may be associated with feedback for the first message. For example, PSFCH resources 425-*a* may be associated with ACK and NACK feedback for the first message. Here, the RIS-enabled UE may transmit PSFCH message 430-*a* using a set of sequences that are different from a set of sequences used for ACK or NACK feedback for the first message within the packet 415-*a*. For example, the RIS-enabled UE may transmit PSFCH message 430-*a* from a set of sequences that are different and orthogonal to the set of sequences used for ACK NACK feedback for the first message.

FIG. 4B may illustrate a transmission scheme 400-*b* where the RIS-enabled UE transmits signaling indicating whether the RIS-enabled UE will perform RIS enhancement for the future transmission using PSFCH resources 425-*b* distinct from PSFCH resources 425 associated with the first message (e.g., detected by the RIS-enabled UE and associated with the packet 415-*b*). For example, the RIS-enabled UE may transmit the PSFCH message 430-*b* within unused resources 435-*a* of the PSFCH resources 425-*b*. In some cases, the RIS-enabled UE may identify the PSFCH resources 425-*b* (e.g., from unused resources 435-*a* or unused resources 435-*b*) based on SCI 420-*b* (or other control information such as a MAC-CE) of packet 415-*b*. Unused resources 435-*a* and unused resources 435-*b* may be PSFCH resources 425-*b* that are not be associated with feedback for the first message (e.g., within the packet 415-*b*). Unused resources 435-*a* and unused resources 435-*b* may represent an unused portion of a PSFCH. For example, unused resources 435-*a* and unused resources 435-*b* may include time and frequency resources of a PSFCH not associated with or reserved for feedback for the first message in the packet 415-*b*.

In some examples, a set of sequences for PSFCH message 430-*b* may be a same set of sequences for ACK or NACK messages. For example, an RIS-enabled UE may transmit a NACK sequence within the PSFCH message 430-*b* to indicate that the RIS-enabled UE will not perform RIS enhancement for a future transmission. In other examples, the RIS-enabled UE may transmit an ACK sequence within the PSFCH message 430-*b* to indicate that the RIS-enabled UE will perform RIS enhancement for the future transmission.

Figure 5:
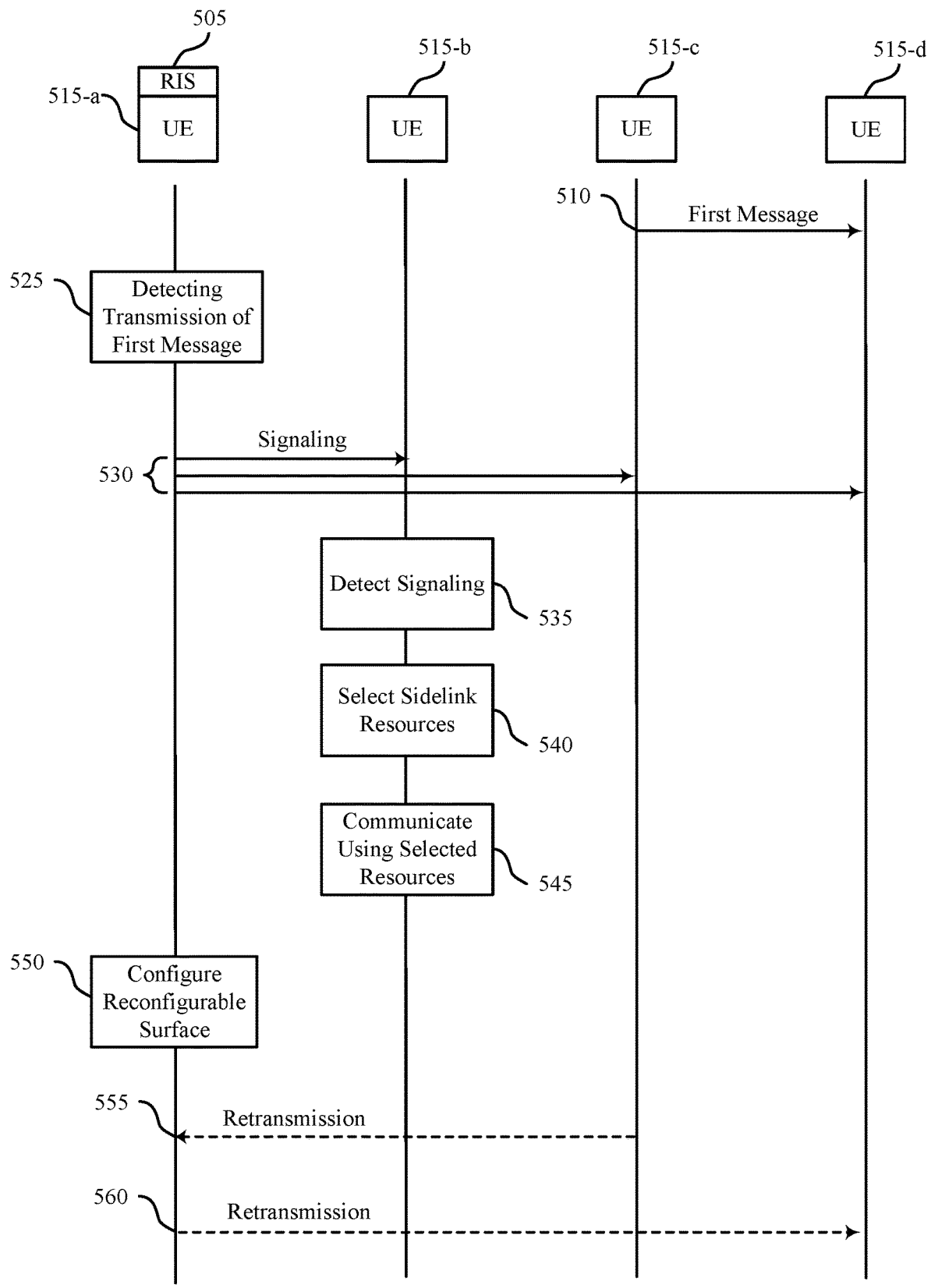
FIGS. 5 and 6 illustrate examples of process flows that support reconfigurable surfaces for sidelink communications in accordance with aspects of the present disclosure.

FIG. 5 illustrates an example of a process flow 500 that supports reconfigurable surfaces for sidelink communications in accordance with aspects of the present disclosure. In some examples, process flow 500 may implement aspects of the wireless communications systems 100 and 200. For example, process flow 500 may include UE 515, which may be examples of corresponding UEs as described with reference to FIGS. 1 and 2. Process flow 500 may also include RIS 505, which may be an example of corresponding RIS 205 as described with reference to FIG. 2.

In the following description of process flow 500, the operations between the UEs 515 may be transmitted in a different order than the order shown, or the operations may be performed at different times. Some operations may also be left out of process flow 500, or other operations may be added to process flow 500. While UEs 515 are shown performing a number of the operations of process flow 500, any wireless device may perform the operations shown. For example, RIS 505 may perform the operations shown.

At 520, UE 515-*c* may transmit a first message to UE 515-*d* via sidelink resources. The first message may include control information (e.g., an SCI, a MAC-CE). In some examples, the control information may include a location of UE 515-*c* (e.g., using a zone identifier of UE 515-*c*), an identifier of UE 515-*d*, a location of UE 515-*d*, a group identifier associated with one or both of UE 515-*c* and UE 515-*d*, a range associated with the first message, a priority associated with communications (e.g., transmissions, services) associated with UE 515-*c*, UE 515-*d*, or both, a priority associated with communications (e.g., transmissions, services) associated with one or more sets of UEs 515, or a combination thereof.

At 525, UE 515-*a* may detect an indication of the first message transmitted over sidelink resources from a UE 515-*c* to UE 515-*d*. For example, UE 515-*a* may detect control information associated with the first message.

At 530, UE 515-*a* may transmit signaling indicating that retransmissions of the first message are reflected by a reconfigurable surface (e.g., RIS 505) associated with UE 515-*a*. That is, UE 515-*a* may determine (e.g., based on detecting the indication of the first message) that performing RIS enhancement for retransmissions of the first message may increase a signal quality of the retransmissions. In some cases, UE 515-*a* may transmit signaling at 530 via a PSFCH using resources associated with feedback for the first message. In some examples, transmitting the signaling may further include transmitting a first sequence from a first set of sequences, where the first set of sequences is unique from a second set of sequences associated with negative acknowledgement signaling and acknowledgement signaling. In some examples, transmitting the signaling may include transmitting the signaling via a PSFCH using resources nonoverlapping with resources associated with feedback for sidelink transmissions. In some examples, transmitting the signaling may further include transmitting a first sequence from a first set of sequences associated with NACK signaling or a second sequence from a second set of sequences reserved for indicating that retransmissions of the first message are reflected by the reconfigurable surface (e.g., RIS 505). UE 515-*a* may transmit the signaling via a broadcast message or a groupcast message. The signaling may further indicate an RSRP for the retransmissions of the first message, power control information associated with the retransmissions reflected by the reconfigurable surface, beam steering information associated with the retransmissions reflected by the reconfigurable surface, a quantity of the retransmissions reflected by the reconfigurable surface, or a combination thereof.

At 535, UE 515-*b* may detect the signaling from UE 515-*a* indicating that retransmissions of the first message are reflected by the RIS 505 associated with UE 515-*a*. For example UE 515-*b* may detect the signaling within resources associated with feedback for the first message in a PSFCH. Here, UE 515-*b* may detect a first sequence from a first set of sequences, where the first set of sequences is unique from a second set of sequences associated with NACK signaling and ACK signaling. In some other examples UE 515-*b* may detect the signaling within resources of a PSFCH that are nonoverlapping with resources associated with feedback for the first message. Here, UE 515-*b* may detect a first sequence from a first set of sequences associated with NACK signaling or a second sequence from a second set of sequences reserved for indicating that retransmissions of the first message are reflected by the RIS 505. In some other examples, UE 515-*b* may detect the signaling at 530 within a broadcast message or a groupcast message from UE 515-*a*.

At 540, UE 515-*b* may select a set of sidelink resources for sidelink communications by UE 515-*b* based on detecting the signaling at 535. For example, UE 515-*b* may select the set of sidelink resources that are distinct from a set of sidelink resources associated with the retransmissions of the first message based on the detecting at 535. In some instances, UE 515-*b* may initially detect an indication of the first message 510 and estimate a first RSRP associated with the retransmissions of the first message based on detecting the indication of the first message. Then, UE 515-*b* may estimate a second RSRP associated with the retransmissions of the first message greater than the first RSRP based on detecting the signaling at 535 indicating that the retransmissions of the first message are reflected by the RIS 505. Here, selecting the set of sidelink resources may be based on estimating the second RSRP. At 545, UE 515-*b* may communicate using the selected set of sidelink resources.

At 550, UE 515-*a* may configure the reconfigurable surface associated with UE 515-*a* for reflecting the retransmissions of the first message from UE 515-*c*. For example, UE 515-*a* may configure RIS 505 for reflecting the retransmissions of the first message from UE 515-*c*. UE 515-*a* may configure one or more reflection coefficients (e.g., associated with an RIS) to reflect sidelink transmissions or retransmissions in a specific direction. For example, UE 515-*a* may configure one or more reflection coefficients such that an angle of reflection of a retransmission is different from an angle of incidence. UE 515-*a* may select one or more coefficients for configuring for the reconfigurable surface (e.g., RIS 505) for reflecting the retransmissions of the first message based on the control information, information from one or more sensors at UE 515-*a*, map information at UE 515-*a*, or a combination thereof.

At 555, UE 515-*c* may transmit the retransmission (e.g., to RIS 505 and/or to UE 515-*a*). At 560, RIS 505 may reflect the retransmission of the first message from UE 515-*c* to UE 515-*d* based on the configuring. For example, RIS 505 may reflect the retransmission based on UE 515-*a* configuring RIS 505.

Figure 6:
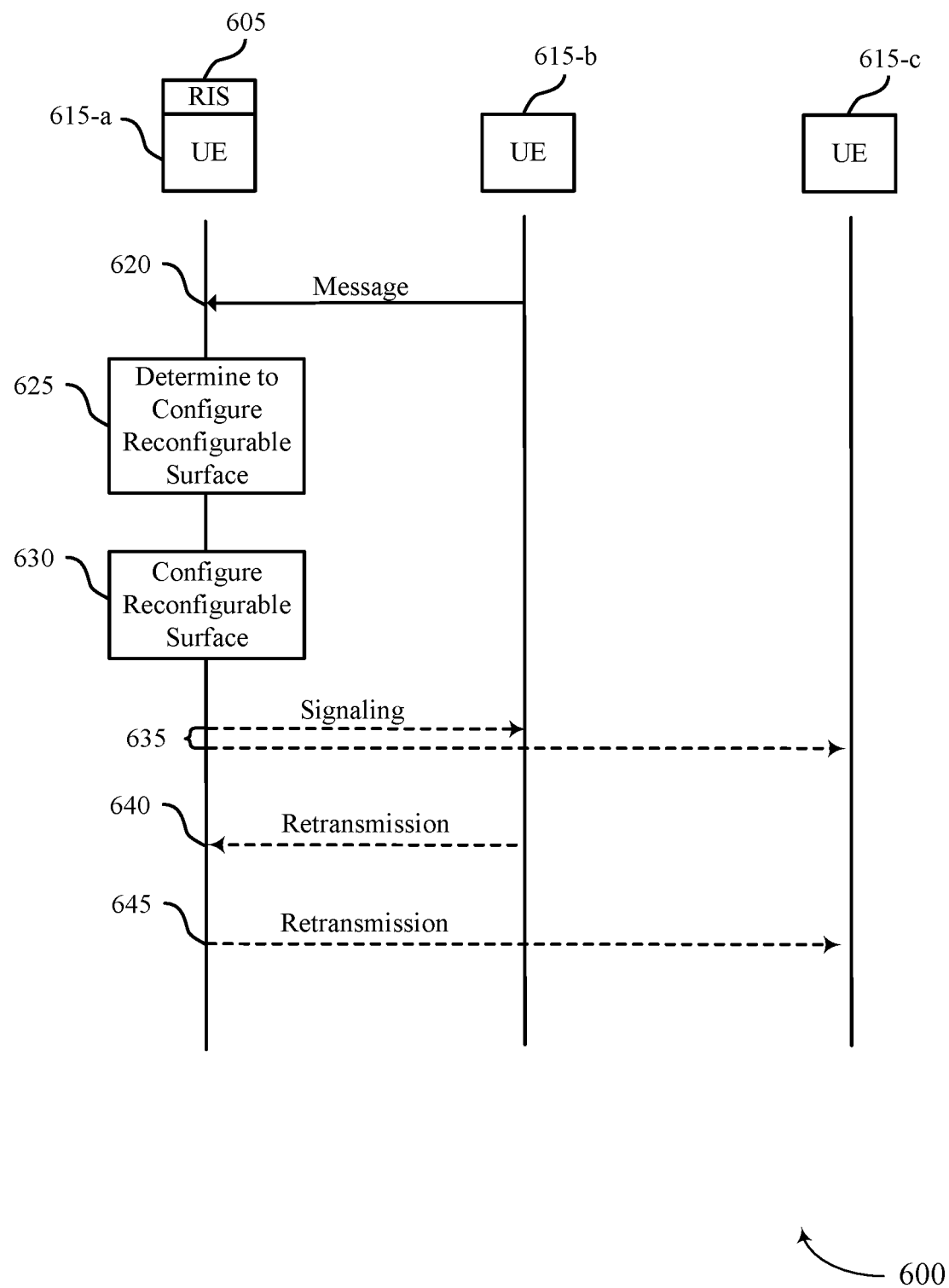

FIG. 6 illustrates an example of a process flow 600 that supports reconfigurable surfaces for sidelink communications in accordance with aspects of the present disclosure. In some examples, process flow 600 may implement aspects of the wireless communications systems 100 and 300. For example, process flow 600 may include UE 615-*a*, UE 615-*b*, and UE 615-*c*, which may be examples of corresponding UEs as described with reference to FIGS. 1 and 3. Process flow 600 may also include RIS 605, which may be an example of corresponding RIS 305 as described with reference to FIG. 3.

In the following description of process flow 600, the operations between the UE 615-*a*, UE 615-*b*, and UE 615-*c* may be transmitted in a different order than the order shown, or the operations may be performed at different times. Some operations may also be left out of process flow 600, or other operations may be added to process flow 600. While UE 615-*a*, UE 615-*b*, and UE 615-*c* are shown performing a number of the operations of process flow 600, any wireless device may perform the operations shown. For example, RIS 605 may perform the operations shown.

At 620, UE 615-*a* may detect, from UE 615-*b*, a message indicating a request for signal enhancement using a reconfigurable surface, the request associated with a future transmission by UE 615-*b*. In some examples, receiving the message may include receiving the message via SCI or via a MAC-CE. In some examples, the message may further indicate resources associated with the future transmission, a location associated with a target UE for the future transmission, an identifier associated with a group of UEs associated with the future transmission, or a combination thereof.

At 625, UE 615-*a* may determine to perform the signal enhancement using a reconfigurable surface for the future transmission by UE 615-*b* based on detecting the message. For example, UE 615-*a* may determine to configure RIS 605 for the future transmission.

At 630, UE 615-*a* may configure the reconfigurable surface at UE 615-*a* for reflecting the future transmission by UE 615-*b* based on the determining. For example, UE 615-*a* may configure RIS 605 for reflecting the future transmission. UE 615-*a* may configure one or more reflection coefficients (e.g., associated with an RIS 605) to reflect sidelink transmissions or retransmissions in a specific direction. For example, UE 615-*a* may configure one or more reflection coefficients of RIS 605 such that an angle of reflection of a retransmission is different from an angle of incidence.

At 635, UE 615-*a* may optionally transmit to UE 615-*b*, signaling indicating the performing of the signal enhancement using a reconfigurable surface at UE 615-*a* for the future transmission by UE 615-*b*, where the configuring is based on transmitting the signaling. Additionally or alternatively, UE 615-*a* may transmit to UE 615-*c*, the signaling indicating the performing of the signal enhancement using a reconfigurable surface. In some examples, transmitting the signaling may include transmitting the signaling via a PSFCH using resources associated with the message. In some examples, transmitting the signaling may include transmitting the signaling via a PSSCH. The signaling may further indicate one or more transmission parameters for the future transmission by UE 615-*b*.

At 640, UE 615-*b* may transmit the retransmission (e.g., to RIS 605 and/or to UE 615-*a*). At 645, RIS 605 may reflect the retransmission of the first message from UE 615-*b* to UE 615-*c* based on the configuring. For example, RIS 605 may reflect the retransmission based on UE 615-*a* configuring RIS 605.

Figure 7:
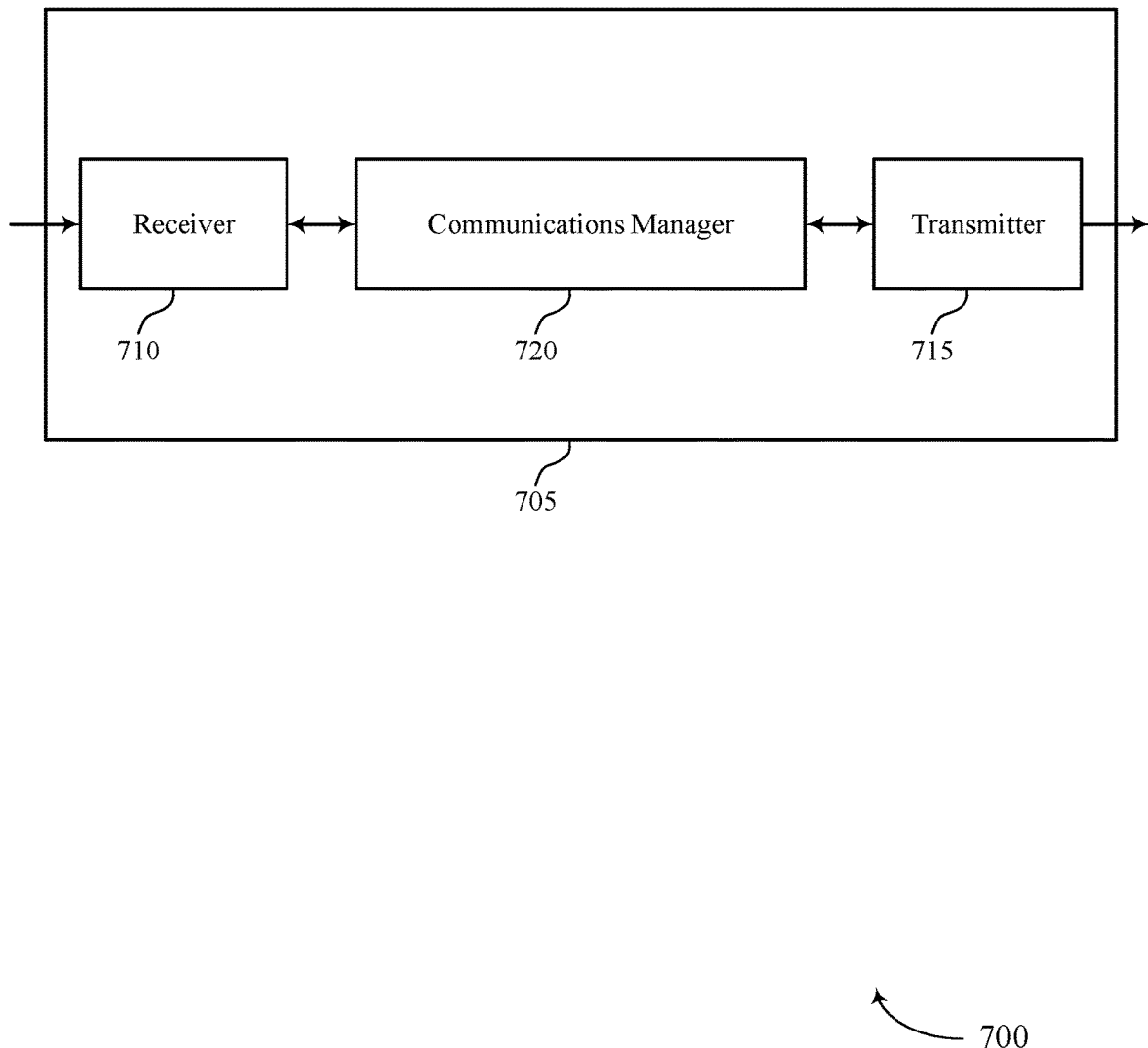
FIGS. 7 and 8 show block diagrams of devices that support reconfigurable surfaces for sidelink communications in accordance with aspects of the present disclosure.

FIG. 7 shows a block diagram 700 of a device 705 that supports reconfigurable surfaces for sidelink communications in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to reconfigurable surfaces for sidelink communications). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to reconfigurable surfaces for sidelink communications). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of reconfigurable surfaces for sidelink communications as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a first UE in accordance with examples as disclosed herein. For example, the communications manager 720 may be configured as or otherwise support a means for detecting, at the first UE, an indication of a first message transmitting over sidelink resources from a second UE to a third UE. The communications manager 720 may be configured as or otherwise support a means for transmitting signaling indicating that retransmissions of the first message are reflected by a reconfigurable surface associated with the first UE. The communications manager 720 may be configured as or otherwise support a means for configuring the reconfigurable surface associated with first UE for reflecting the retransmissions of the first message from the second UE.

Additionally or alternatively, the communications manager 720 may support wireless communication at a first UE in accordance with examples as disclosed herein. For example, the communications manager 720 may be configured as or otherwise support a means for detecting, from a second UE, signaling indicating that retransmissions of a first message from a third UE to a fourth UE are reflected by a reconfigurable surface associated with the second UE. The communications manager 720 may be configured as or otherwise support a means for selecting a set of sidelink resources for sidelink communications by the first UE based on the detected signaling. The communications manager 720 may be configured as or otherwise support a means for communicating using the selected set of sidelink resources.

Additionally or alternatively, the communications manager 720 may support wireless communications at a first UE including a reconfigurable surface in accordance with examples as disclosed herein. For example, the communications manager 720 may be configured as or otherwise support a means for detecting, from a second UE, a message indicating a request for signal enhancement using a reconfigurable surface, the request associated with a future transmission by the second UE. The communications manager 720 may be configured as or otherwise support a means for determining to perform the signal enhancement using a reconfigurable surface for the future transmission by the second UE based on detecting the message. The communications manager 720 may be configured as or otherwise support a means for configuring the reconfigurable surface at the first UE for reflecting the future transmission by the second UE based on the determining.

Additionally or alternatively, the communications manager 720 may support wireless communications at a first UE in accordance with examples as disclosed herein. For example, the communications manager 720 may be configured as or otherwise support a means for determining that a channel condition for sidelink communications between the first UE and a second UE falls below a quality threshold. The communications manager 720 may be configured as or otherwise support a means for transmitting, based on the determining, a first message including a request for signal enhancement using a reconfigurable surface, the request associated with a second message transmitted by the first UE subsequent to transmitting the first message. The communications manager 720 may be configured as or otherwise support a means for transmitting the second message based on transmitting the second message.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for more efficient utilization of communication resources.

Figure 8:
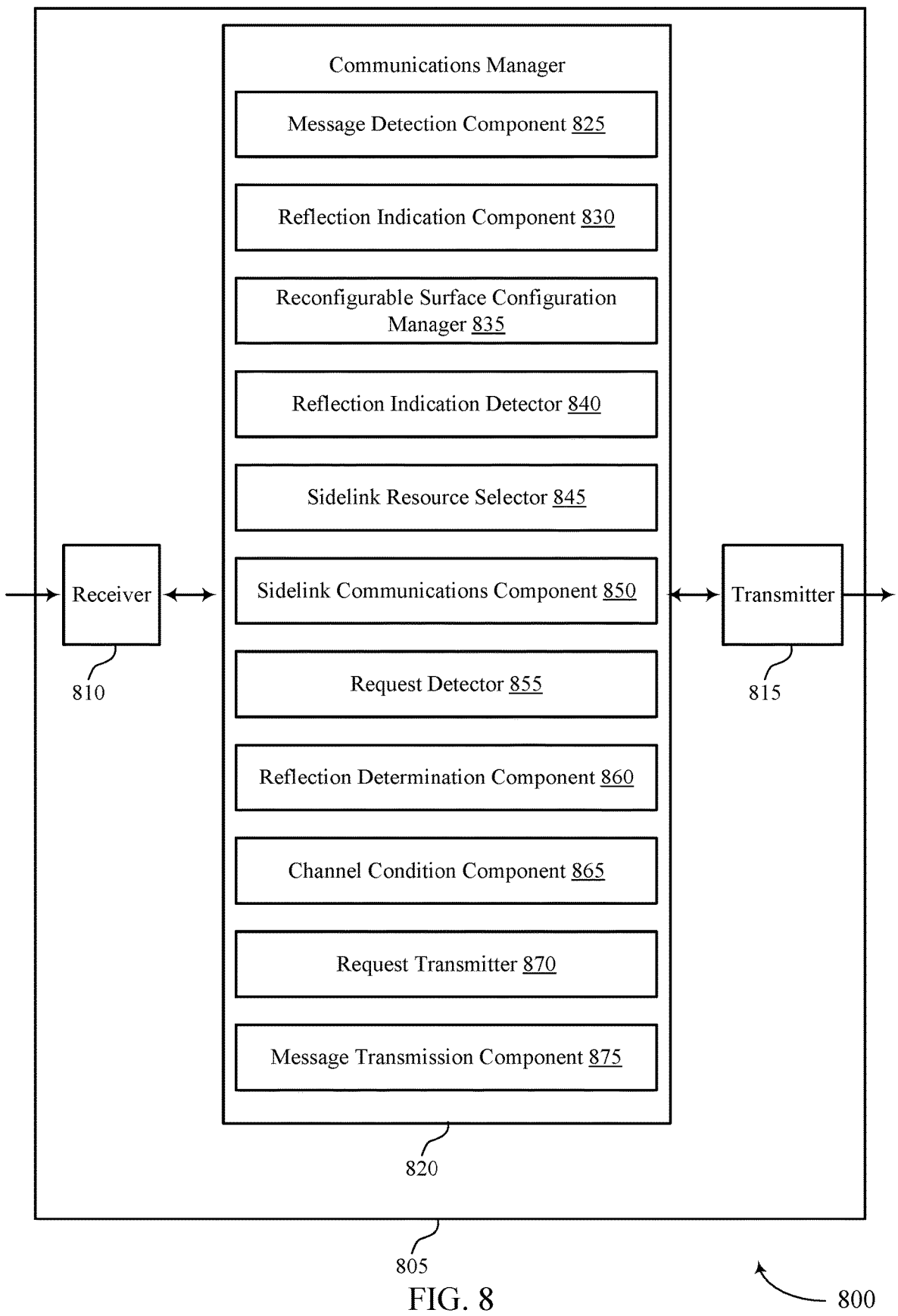

FIG. 8 shows a block diagram 800 of a device 805 that supports reconfigurable surfaces for sidelink communications in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to reconfigurable surfaces for sidelink communications). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to reconfigurable surfaces for sidelink communications). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of reconfigurable surfaces for sidelink communications as described herein. For example, the communications manager 820 may include a message detection component 825, a reflection indication component 830, a reconfigurable surface configuration manager 835, a reflection indication detector 840, a sidelink resource selector 845, a sidelink communications component 850, a request detector 855, a reflection determination component 860, a channel condition component 865, a request transmitter 870, a message transmission component 875, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a first UE in accordance with examples as disclosed herein. The message detection component 825 may be configured as or otherwise support a means for detecting, at the first UE, an indication of a first message transmitted over sidelink resources from a second UE to a third UE. The reflection indication component 830 may be configured as or otherwise support a means for transmitting signaling indicating that retransmissions of the first message are reflected by a reconfigurable surface associated with the first UE. The reconfigurable surface configuration manager 835 may be configured as or otherwise support a means for configuring the reconfigurable surface associated with first UE for reflecting the retransmissions of the first message from the second UE.

Additionally or alternatively, the communications manager 820 may support wireless communication at a first UE in accordance with examples as disclosed herein. The reflection indication detector 840 may be configured as or otherwise support a means for detecting, from a second UE, signaling indicating that retransmissions of a first message from a third UE to a fourth UE are reflected by a reconfigurable surface associated with the second UE. The sidelink resource selector 845 may be configured as or otherwise support a means for selecting a set of sidelink resources for sidelink communications by the first UE based on the detected signaling. The sidelink communications component 850 may be configured as or otherwise support a means for communicating using the selected set of sidelink resources.

Additionally or alternatively, the communications manager 820 may support wireless communications at a first UE including a reconfigurable surface in accordance with examples as disclosed herein. The request detector 855 may be configured as or otherwise support a means for detecting, from a second UE, a message indicating a request for signal enhancement using a reconfigurable surface, the request associated with a future transmission by the second UE. The reflection determination component 860 may be configured as or otherwise support a means for determining to perform the signal enhancement using a reconfigurable surface for the future transmission by the second UE based on detecting the message. The reconfigurable surface configuration manager 835 may be configured as or otherwise support a means for configuring the reconfigurable surface at the first UE for reflecting the future transmission by the second UE based on the determining.

Additionally or alternatively, the communications manager 820 may support wireless communications at a first UE in accordance with examples as disclosed herein. The channel condition component 865 may be configured as or otherwise support a means for determining that a channel condition for sidelink communications between the first UE and a second UE falls below a quality threshold. The request transmitter 870 may be configured as or otherwise support a means for transmitting, based on the determining, a first message including a request for signal enhancement using a reconfigurable surface, the request associated with a second message transmitted by the first UE subsequent to transmitting the first message. The message transmission component 875 may be configured as or otherwise support a means for transmitting the second message based on transmitting the second message.

Figure 9:
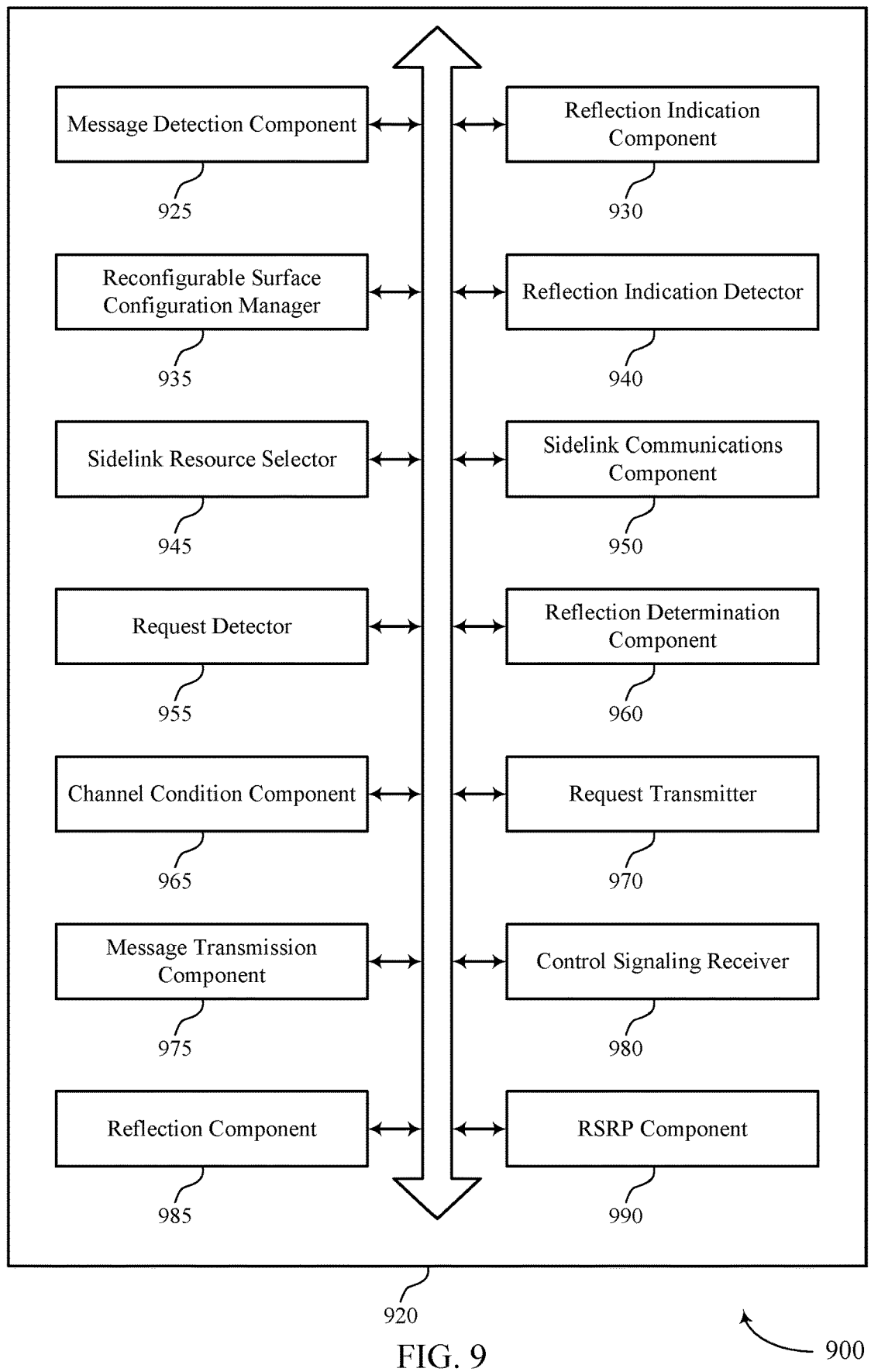
FIG. 9 shows a block diagram of a communications manager that supports reconfigurable surfaces for sidelink communications in accordance with aspects of the present disclosure.

FIG. 9 shows a block diagram 900 of a communications manager 920 that supports reconfigurable surfaces for sidelink communications in accordance with aspects of the present disclosure. The communications manager 920 may be an example of aspects of a communications manager 720, a communications manager 820, or both, as described herein. The communications manager 920, or various components thereof, may be an example of means for performing various aspects of reconfigurable surfaces for sidelink communications as described herein. For example, the communications manager 920 may include a message detection component 925, a reflection indication component 930, a reconfigurable surface configuration manager 935, a reflection indication detector 940, a sidelink resource selector 945, a sidelink communications component 950, a request detector 955, a reflection determination component 960, a channel condition component 965, a request transmitter 970, a message transmission component 975, a control signaling receiver 980, a reflection component 985, an RSRP component 990, or any combination thereof. Each of these components may communicate, directly or indirectly, with one another (e.g., via one or more buses).

The communications manager 920 may support wireless communication at a first UE in accordance with examples as disclosed herein. The message detection component 925 may be configured as or otherwise support a means for detecting, at the first UE, an indication of a first message transmitted over sidelink resources from a second UE to a third UE. The reflection indication component 930 may be configured as or otherwise support a means for transmitting signaling indicating that retransmissions of the first message are reflected by a reconfigurable surface associated with the first UE. The reconfigurable surface configuration manager 935 may be configured as or otherwise support a means for configuring the reconfigurable surface associated with first UE for reflecting the retransmissions of the first message from the second UE.

In some examples, the control signaling receiver 980 may be configured as or otherwise support a means for receiving control information from the second UE, where detecting the indication of the first message is based on receiving the control information.

In some examples, the reconfigurable surface configuration manager 935 may be configured as or otherwise support a means for selecting one or more coefficients for configuring for the reconfigurable surface for reflecting the retransmissions of the first message based on the control information, information from one or more sensors at the first UE, map information at the first UE, or a combination thereof.

In some examples, the control information includes a location of the second UE, an identifier of the third UE, a location of the third UE, a group identifier associated with one or both of the second UE and the third UE, a range associated with the first message, a priority associated with communications with UEs, a priority associated with communications with one or more sets of UEs, or a combination thereof.

In some examples, to support receiving the control information, the control signaling receiver 980 may be configured as or otherwise support a means for receiving SCI, receiving a MAC-CE, or a combination thereof.

In some examples, to support transmitting the signaling, the reflection indication component 930 may be configured as or otherwise support a means for transmitting the signaling via a physical sidelink feedback channel using resources associated with feedback for the first message.

In some examples, to support transmitting the signaling, the reflection indication component 930 may be configured as or otherwise support a means for transmitting a first sequence from a first set of sequences, where the first set of sequences is unique from a second set of sequences associated with negative acknowledgement signaling and acknowledgement signaling.

In some examples, to support transmitting the signaling, the reflection indication component 930 may be configured as or otherwise support a means for transmitting the signaling via a physical sidelink feedback channel using resources nonoverlapping with resources associated with feedback for sidelink transmissions.

In some examples, to support transmitting the signaling, the reflection indication component 930 may be configured as or otherwise support a means for transmitting a first sequence from a first set of sequences associated with negative acknowledgement signaling or a second sequence from a second set of sequences reserved for indicating that retransmissions of the first message are reflected by the reconfigurable surface.

In some examples, to support transmitting the signaling, the reflection indication component 930 may be configured as or otherwise support a means for transmitting the signaling via a broadcast message or a groupcast message.

In some examples, the signaling further indicates an RSRP for the retransmissions of the first message, power control information associated with the retransmissions reflected by the reconfigurable surface, beam steering information associated with the retransmissions reflected by the reconfigurable surface, a quantity of the retransmissions reflected by the reconfigurable surface, or a combination thereof.

In some examples, the reflection component 985 may be configured as or otherwise support a means for reflecting a retransmission of the first message from the second UE to the third UE based on the configuring.

Additionally or alternatively, the communications manager 920 may support wireless communication at a first UE in accordance with examples as disclosed herein. The reflection indication detector 940 may be configured as or otherwise support a means for detecting, from a second UE, signaling indicating that retransmissions of a first message from a third UE to a fourth UE are reflected by a reconfigurable surface associated with the second UE. The sidelink resource selector 945 may be configured as or otherwise support a means for selecting a set of sidelink resources for sidelink communications by the first UE based on the detected signaling. The sidelink communications component 950 may be configured as or otherwise support a means for communicating using the selected set of sidelink resources.

In some examples, to support selecting, the sidelink resource selector 945 may be configured as or otherwise support a means for selecting the set of sidelink resources that are distinct from a second set of sidelink resources associated with the retransmissions of the first message based on the detecting.

In some examples, the reflection indication detector 940 may be configured as or otherwise support a means for detecting, at the first UE, an indication of the first message from the third UE to the fourth UE. In some examples, the RSRP component 990 may be configured as or otherwise support a means for estimating a first RSRP associated with the retransmissions of the first message based on detecting the indication of the first message, where detecting the signaling is based on the estimating. In some examples, the RSRP component 990 may be configured as or otherwise support a means for estimating a second RSRP associated with the retransmissions of the first message greater than the first RSRP based on detecting the signaling indicating that the retransmissions of the first message are reflected by the reconfigurable surface, where the selecting is based on estimating the second RSRP.

In some examples, to support detecting the signaling, the reflection indication detector 940 may be configured as or otherwise support a means for detecting the signaling within resources associated with feedback for the first message in a physical sidelink feedback channel.

In some examples, to support detecting the signaling, the reflection indication detector 940 may be configured as or otherwise support a means for detecting a first sequence from a first set of sequences, where the first set of sequences is unique from a second set of sequences associated with negative acknowledgement signaling and acknowledgement signaling.

In some examples, to support detecting the signaling, the reflection indication detector 940 may be configured as or otherwise support a means for detecting the signaling within resources of a physical sidelink feedback channel that are nonoverlapping with resources associated with feedback for the first message.

In some examples, to support detecting the signaling, the reflection indication detector 940 may be configured as or otherwise support a means for detecting a first sequence from a first set of sequences associated with negative acknowledgement signaling or a second sequence from a second set of sequences reserved for indicating that retransmissions of the first message are reflected by the reconfigurable surface.

In some examples, to support detecting the signaling, the reflection indication detector 940 may be configured as or otherwise support a means for detecting the signaling within a broadcast message or a groupcast message.

In some examples, the signaling further indicates an RSRP for the retransmissions of the first message, power control information associated with the retransmissions reflected by the reconfigurable surface, beam steering information associated with the retransmissions reflected by the reconfigurable surface, a quantity of the retransmissions reflected by the reconfigurable surface, or a combination thereof.

Additionally or alternatively, the communications manager 920 may support wireless communications at a first UE including a reconfigurable surface in accordance with examples as disclosed herein. The request detector 955 may be configured as or otherwise support a means for detecting, from a second UE, a message indicating a request for signal enhancement using a reconfigurable surface, the request associated with a future transmission by the second UE. The reflection determination component 960 may be configured as or otherwise support a means for determining to perform the signal enhancement using a reconfigurable surface for the future transmission by the second UE based on detecting the message. In some examples, the reconfigurable surface configuration manager 935 may be configured as or otherwise support a means for configuring the reconfigurable surface at the first UE for reflecting the future transmission by the second UE based on the determining.

In some examples, the reflection indication component 930 may be configured as or otherwise support a means for transmitting, to the second UE, signaling indicating the performing of the signal enhancement using a reconfigurable surface at the first UE for the future transmission by the second UE, where the configuring is based on transmitting the signaling.

In some examples, to support transmitting the signaling, the reflection indication component 930 may be configured as or otherwise support a means for transmitting the signaling via a physical sidelink feedback channel using resources associated with the message.

In some examples, to support transmitting the signaling, the reflection indication component 930 may be configured as or otherwise support a means for transmitting the signaling via a physical sidelink shared channel.

In some examples, the signaling further indicates one or more transmissions parameters for the future transmission by the second UE.

In some examples, to support receiving the message, the request detector 955 may be configured as or otherwise support a means for receiving the message via SCI or via a MAC-CE.

In some examples, the message further indicates resources associated with the future transmission, a location associated with a target UE for the future transmission, an identifier associated with a group of UEs associated with the future transmission, or a combination thereof.

Additionally or alternatively, the communications manager 920 may support wireless communications at a first UE in accordance with examples as disclosed herein. The channel condition component 965 may be configured as or otherwise support a means for determining that a channel condition for sidelink communications between the first UE and a second UE falls below a quality threshold. The request transmitter 970 may be configured as or otherwise support a means for transmitting, based on the determining, a first message including a request for signal enhancement using a reconfigurable surface, the request associated with a second message transmitted by the first UE subsequent to transmitting the first message. The message transmission component 975 may be configured as or otherwise support a means for transmitting the second message based on transmitting the second message.

In some examples, the reflection indication detector 940 may be configured as or otherwise support a means for receiving, from a third UE, signaling indicating that the third UE is performing the signal enhancement using a reconfigurable surface for the second message, where transmitting the second message is based on receiving the signaling.

In some examples, to support receiving the signaling, the reflection indication detector 940 may be configured as or otherwise support a means for receiving the signaling via a physical sidelink feedback channel using resources associated with the first message.

In some examples, to support receiving the signaling, the reflection indication detector 940 may be configured as or otherwise support a means for receiving the signaling via a physical sidelink shared channel.

In some examples, the signaling further indicates one or more transmissions parameters for the second message by the first UE.

In some examples, to support transmitting the first message, the request transmitter 970 may be configured as or otherwise support a means for transmitting the first message via SCI or via a MAC-CE.

In some examples, the first message further indicates resources associated with the second message, a location associated with the second UE, an identifier associated with a group of UEs including at least the second UE, or a combination thereof.

Figure 10:
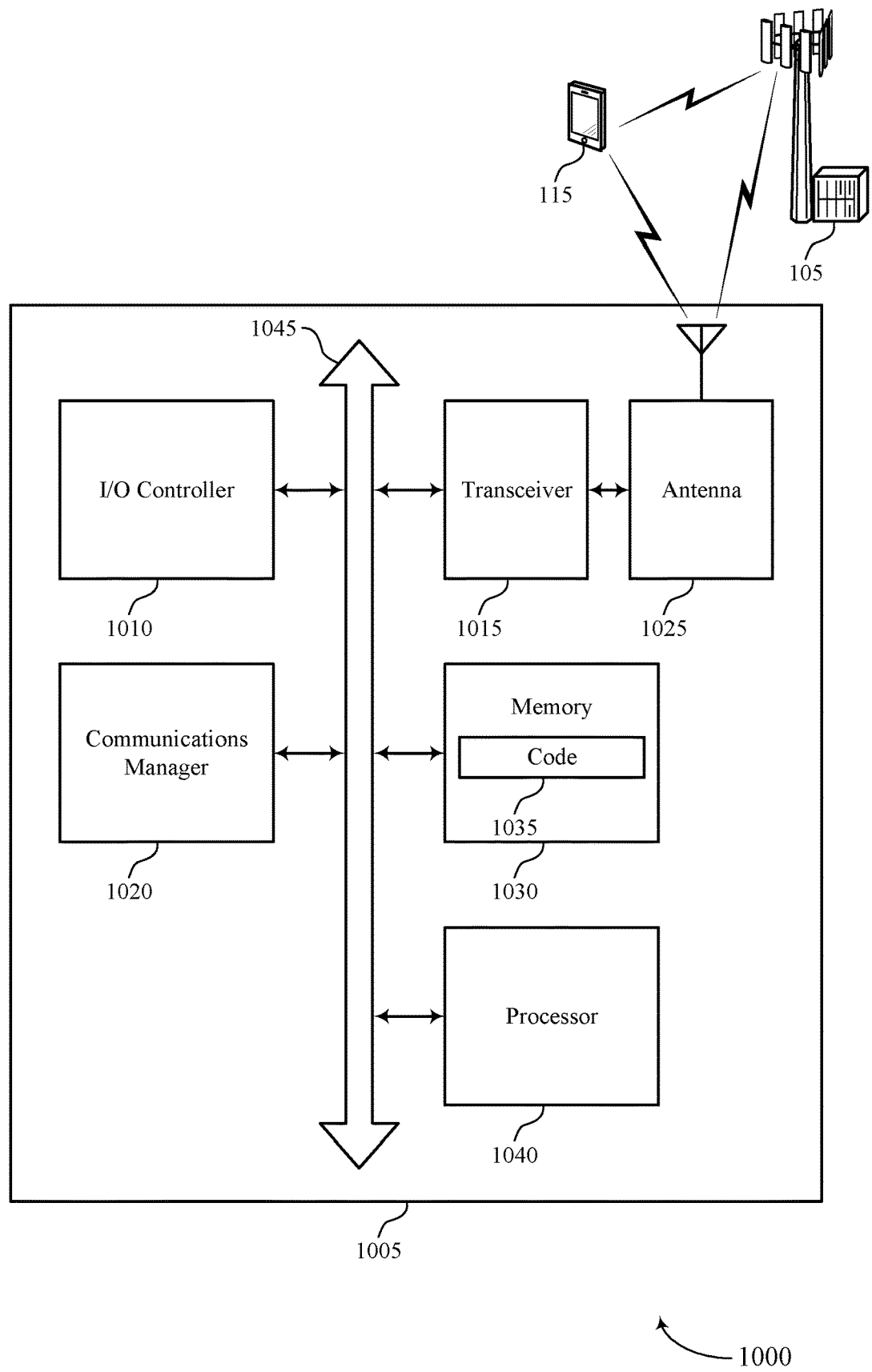
FIG. 10 shows a diagram of a system including a device that supports reconfigurable surfaces for sidelink communications in accordance with aspects of the present disclosure.

FIG. 10 shows a diagram of a system 1000 including a device 1005 that supports reconfigurable surfaces for sidelink communications in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting reconfigurable surfaces for sidelink communications). For example, the device 1005 or a component of the device 1005 may include a processor 1040 and memory 1030 coupled to the processor 1040, the processor 1040 and memory 1030 configured to perform various functions described herein.

The communications manager 1020 may support wireless communication at a first UE in accordance with examples as disclosed herein. For example, the communications manager 1020 may be configured as or otherwise support a means for detecting, at the first UE, an indication of a first message transmitting over sidelink resources from a second UE to a third UE. The communications manager 1020 may be configured as or otherwise support a means for transmitting signaling indicating that retransmissions of the first message are reflected by a reconfigurable surface associated with the first UE. The communications manager 1020 may be configured as or otherwise support a means for configuring the reconfigurable surface associated with first UE for reflecting the retransmissions of the first message from the second UE.

Additionally or alternatively, the communications manager 1020 may support wireless communication at a first UE in accordance with examples as disclosed herein. For example, the communications manager 1020 may be configured as or otherwise support a means for detecting, from a second UE, signaling indicating that retransmissions of a first message from a third UE to a fourth UE are reflected by a reconfigurable surface associated with the second UE. The communications manager 1020 may be configured as or otherwise support a means for selecting a set of sidelink resources for sidelink communications by the first UE based on the detected signaling. The communications manager 1020 may be configured as or otherwise support a means for communicating using the selected set of sidelink resources.

Additionally or alternatively, the communications manager 1020 may support wireless communications at a first UE including a reconfigurable surface in accordance with examples as disclosed herein. For example, the communications manager 1020 may be configured as or otherwise support a means for detecting, from a second UE, a message indicating a request for signal enhancement using a reconfigurable surface, the request associated with a future transmission by the second UE. The communications manager 1020 may be configured as or otherwise support a means for determining to perform the signal enhancement using a reconfigurable surface for the future transmission by the second UE based on detecting the message. The communications manager 1020 may be configured as or otherwise support a means for configuring the reconfigurable surface at the first UE for reflecting the future transmission by the second UE based on the determining.

Additionally or alternatively, the communications manager 1020 may support wireless communications at a first UE in accordance with examples as disclosed herein. For example, the communications manager 1020 may be configured as or otherwise support a means for determining that a channel condition for sidelink communications between the first UE and a second UE falls below a quality threshold. The communications manager 1020 may be configured as or otherwise support a means for transmitting, based on the determining, a first message including a request for signal enhancement using a reconfigurable surface, the request associated with a second message transmitted by the first UE subsequent to transmitting the first message. The communications manager 1020 may be configured as or otherwise support a means for transmitting the second message based on transmitting the second message.

By including or configuring the communications manager 1020 in accordance with examples as described herein, the device 1005 may support techniques for improved communication reliability, more efficient utilization of communication resources, and improved coordination between devices.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of reconfigurable surfaces for sidelink communications as described herein, or the processor 1040 and the memory 1030 may be otherwise configured to perform or support such operations.

Figure 11:
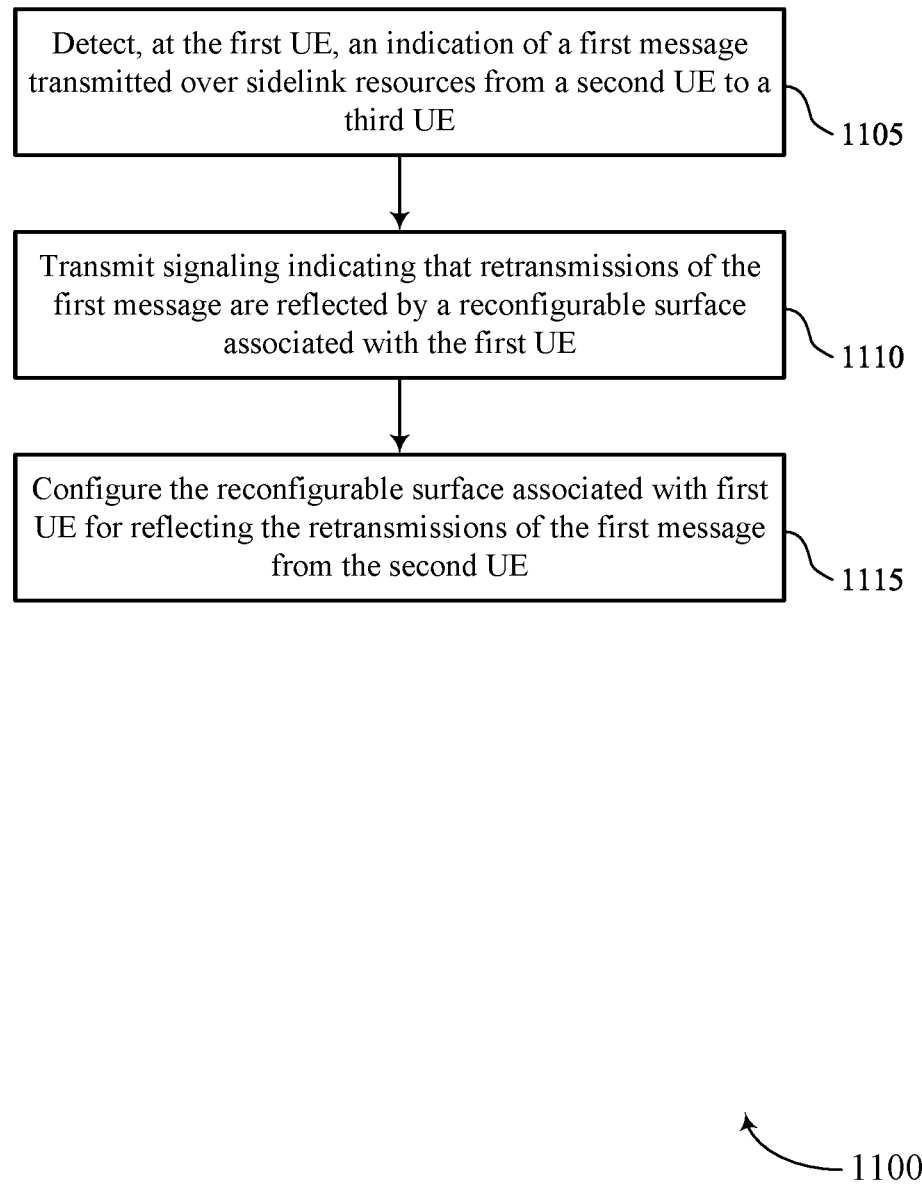
FIGS. 11 through 16 show flowcharts illustrating methods that support reconfigurable surfaces for sidelink communications in accordance with aspects of the present disclosure.

FIG. 11 shows a flowchart illustrating a method 1100 that supports reconfigurable surfaces for sidelink communications in accordance with aspects of the present disclosure. The operations of the method 1100 may be implemented by a UE or its components as described herein. For example, the operations of the method 1100 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1105, the method may include detecting, at the first UE, an indication of a first message transmitted over sidelink resources from a second UE to a third UE. The operations of 1105 may be performed in accordance with examples as disclosed herein. In some examples, aspects of the operations of 1105 may be performed by a message detection component 925 as described with reference to FIG. 9.

At 1110, the method may include transmitting signaling indicating that retransmissions of the first message are reflected by a reconfigurable surface associated with the first UE. The operations of 1110 may be performed in accordance with examples as disclosed herein. In some examples, aspects of the operations of 1110 may be performed by a reflection indication component 930 as described with reference to FIG. 9.

At 1115, the method may include configuring the reconfigurable surface associated with first UE for reflecting the retransmissions of the first message from the second UE. The operations of 1115 may be performed in accordance with examples as disclosed herein. In some examples, aspects of the operations of 1115 may be performed by a reconfigurable surface configuration manager 935 as described with reference to FIG. 9.

Figure 12:
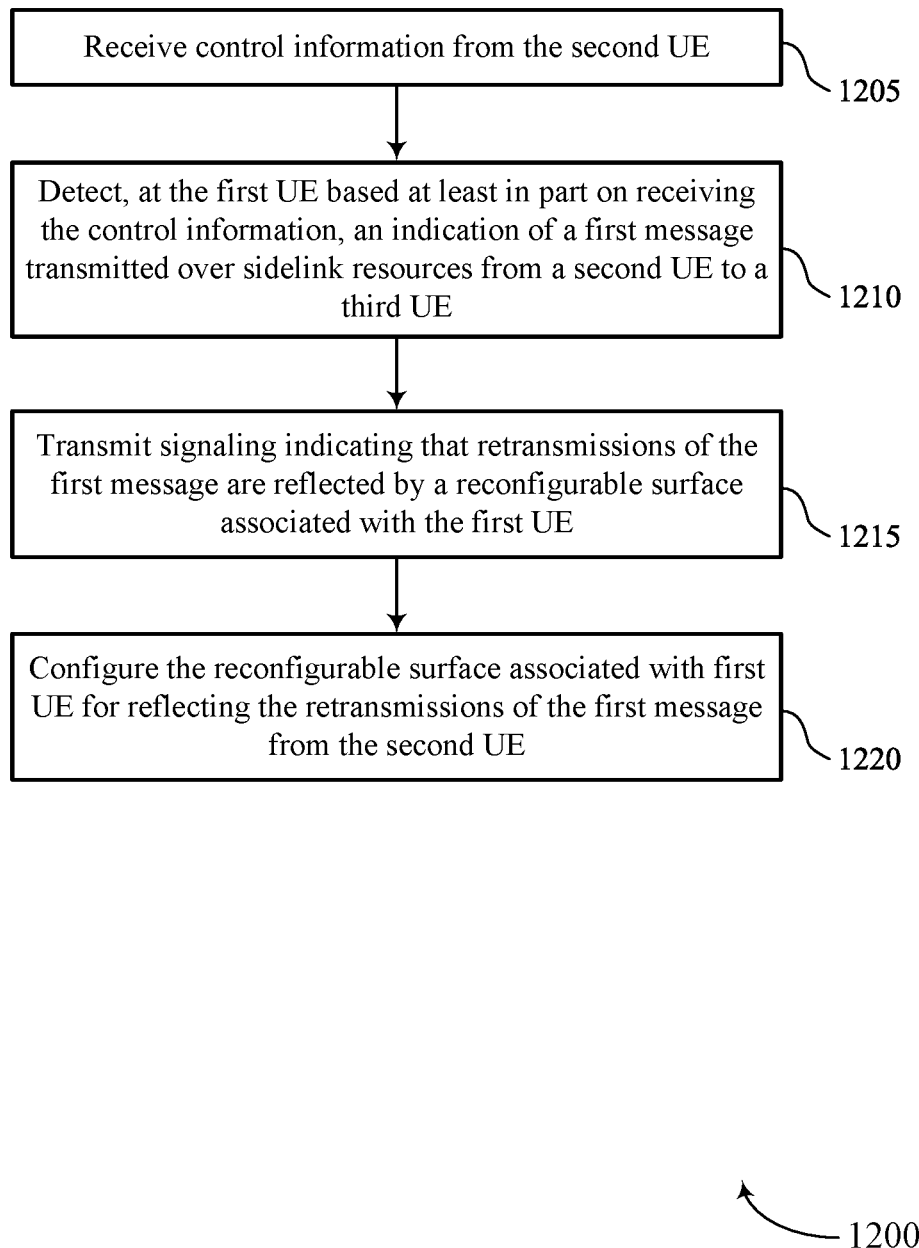

FIG. 12 shows a flowchart illustrating a method 1200 that supports reconfigurable surfaces for sidelink communications in accordance with aspects of the present disclosure. The operations of the method 1200 may be implemented by a UE or its components as described herein. For example, the operations of the method 1200 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1205, the method may include receiving control information from the second UE, where detecting the indication of the first message is based on receiving the control information. The operations of 1205 may be performed in accordance with examples as disclosed herein. In some examples, aspects of the operations of 1205 may be performed by a control signaling receiver 980 as described with reference to FIG. 9.

At 1210, the method may include detecting, at the first UE, an indication of a first message transmitted over sidelink resources from a second UE to a third UE. The operations of 1210 may be performed in accordance with examples as disclosed herein. In some examples, aspects of the operations of 1210 may be performed by a message detection component 925 as described with reference to FIG. 9.

At 1215, the method may include transmitting signaling indicating that retransmissions of the first message are reflected by a reconfigurable surface associated with the first UE. The operations of 1215 may be performed in accordance with examples as disclosed herein. In some examples, aspects of the operations of 1215 may be performed by a reflection indication component 930 as described with reference to FIG. 9.

At 1220, the method may include configuring the reconfigurable surface associated with first UE for reflecting the retransmissions of the first message from the second UE. The operations of 1220 may be performed in accordance with examples as disclosed herein. In some examples, aspects of the operations of 1220 may be performed by a reconfigurable surface configuration manager 935 as described with reference to FIG. 9.

Figure 13:
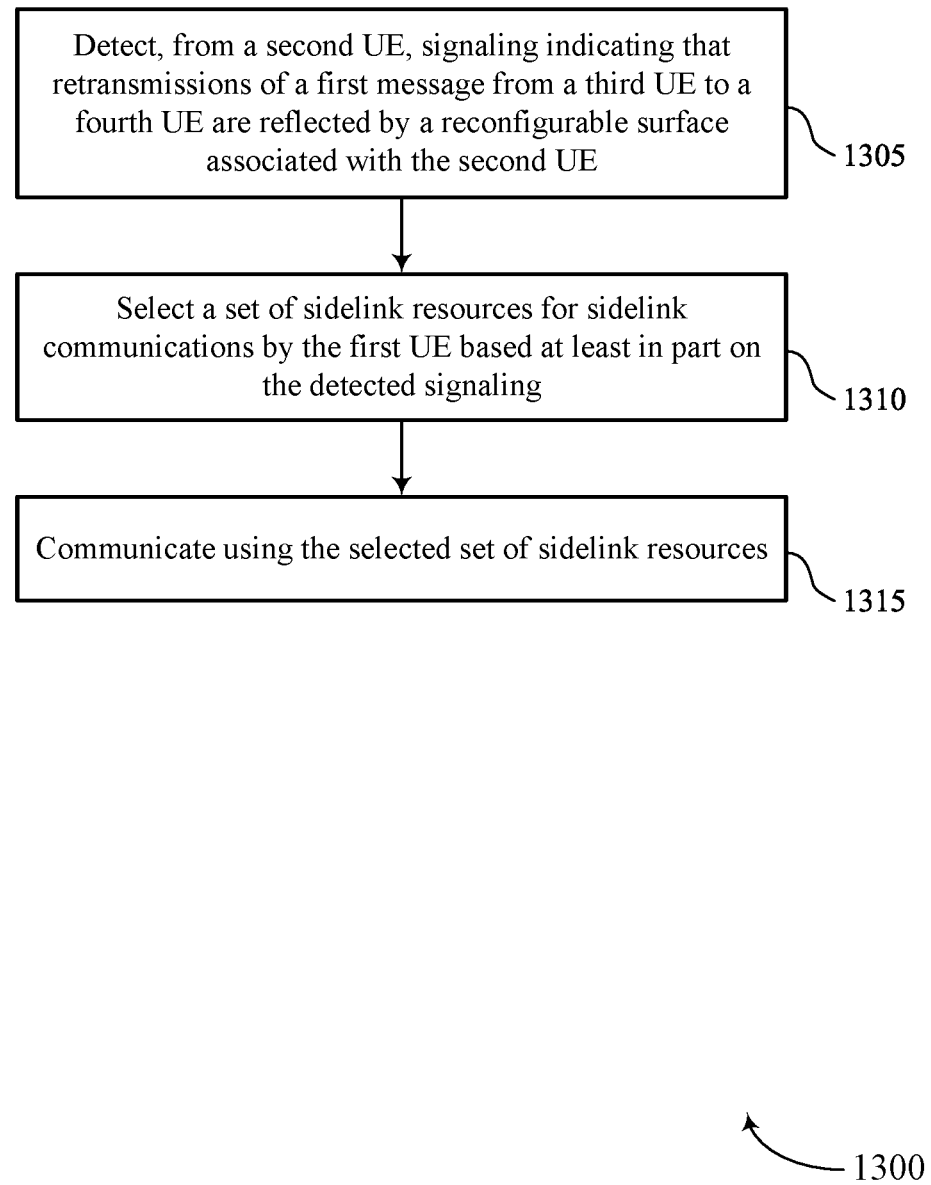

FIG. 13 shows a flowchart illustrating a method 1300 that supports reconfigurable surfaces for sidelink communications in accordance with aspects of the present disclosure. The operations of the method 1300 may be implemented by a UE or its components as described herein. For example, the operations of the method 1300 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1305, the method may include detecting, from a second UE, signaling indicating that retransmissions of a first message from a third UE to a fourth UE are reflected by a reconfigurable surface associated with the second UE. The operations of 1305 may be performed in accordance with examples as disclosed herein. In some examples, aspects of the operations of 1305 may be performed by a reflection indication detector 940 as described with reference to FIG. 9.

At 1310, the method may include selecting a set of sidelink resources for sidelink communications by the first UE based on the detected signaling. The operations of 1310 may be performed in accordance with examples as disclosed herein. In some examples, aspects of the operations of 1310 may be performed by a sidelink resource selector 945 as described with reference to FIG. 9.

At 1315, the method may include communicating using the selected set of sidelink resources. The operations of 1315 may be performed in accordance with examples as disclosed herein. In some examples, aspects of the operations of 1315 may be performed by a sidelink communications component 950 as described with reference to FIG. 9.

Figure 14:
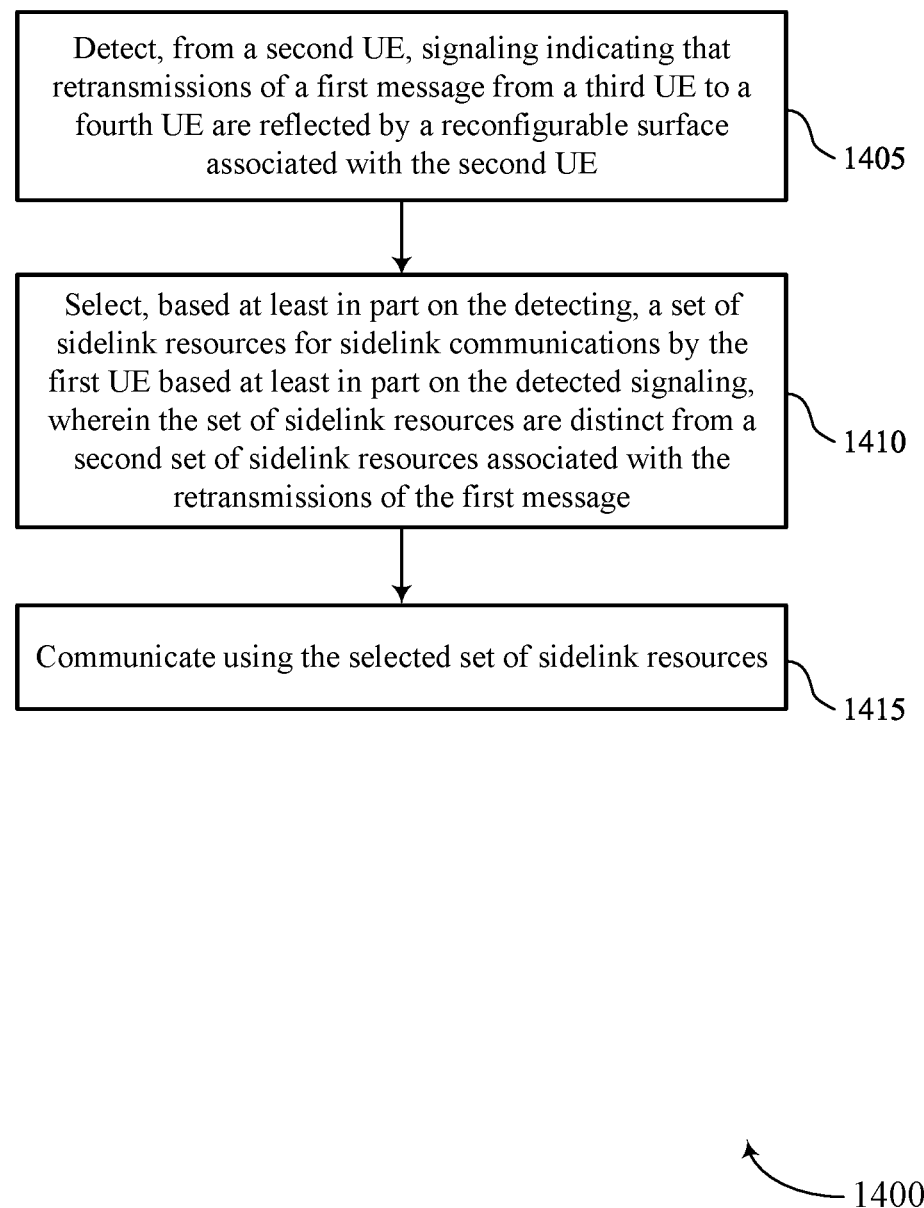

FIG. 14 shows a flowchart illustrating a method 1400 that supports reconfigurable surfaces for sidelink communications in accordance with aspects of the present disclosure. The operations of the method 1400 may be implemented by a UE or its components as described herein. For example, the operations of the method 1400 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1405, the method may include detecting, from a second UE, signaling indicating that retransmissions of a first message from a third UE to a fourth UE are reflected by a reconfigurable surface associated with the second UE. The operations of 1405 may be performed in accordance with examples as disclosed herein. In some examples, aspects of the operations of 1405 may be performed by a reflection indication detector 940 as described with reference to FIG. 9.

At 1410, the method may include selecting a set of sidelink resources for sidelink communications by the first UE based on the detected signaling. The operations of 1410 may be performed in accordance with examples as disclosed herein. In some examples, aspects of the operations of 1410 may be performed by a sidelink resource selector 945 as described with reference to FIG. 9.

At 1415, the method may include communicating using the selected set of sidelink resources. The operations of 1415 may be performed in accordance with examples as disclosed herein. In some examples, aspects of the operations of 1415 may be performed by a sidelink communications component 950 as described with reference to FIG. 9.

At 1420, the method may include selecting the set of sidelink resources that are distinct from a second set of sidelink resources associated with the retransmissions of the first message based on the detecting. The operations of 1420 may be performed in accordance with examples as disclosed herein. In some examples, aspects of the operations of 1420 may be performed by a sidelink resource selector 945 as described with reference to FIG. 9.

Figure 15:
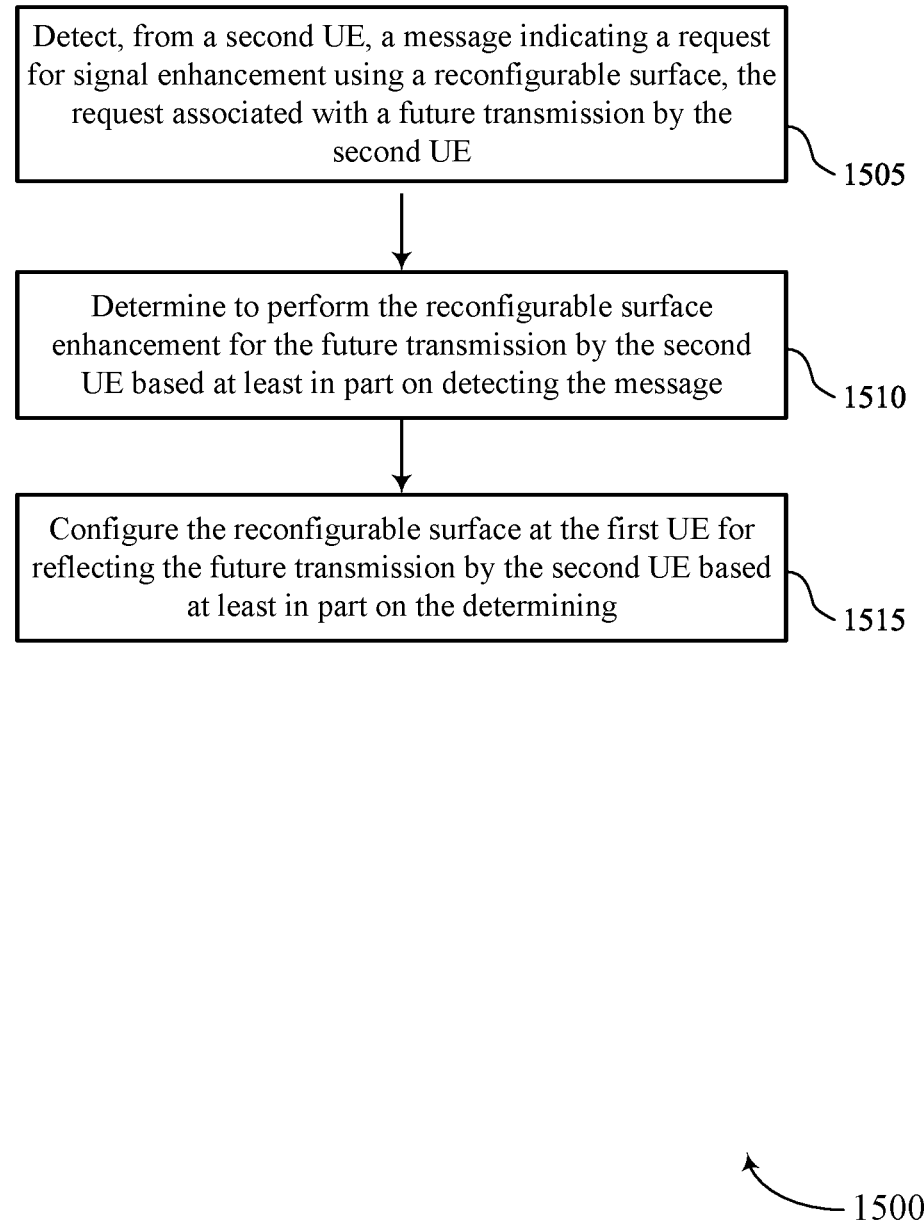

FIG. 15 shows a flowchart illustrating a method 1500 that supports reconfigurable surfaces for sidelink communications in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include detecting, from a second UE, a message indicating a request for signal enhancement using a reconfigurable surface, the request associated with a future transmission by the second UE. The operations of 1505 may be performed in accordance with examples as disclosed herein. In some examples, aspects of the operations of 1505 may be performed by a request detector 955 as described with reference to FIG. 9.

At 1510, the method may include determining to perform the signal enhancement using a reconfigurable surface for the future transmission by the second UE based on detecting the message. The operations of 1510 may be performed in accordance with examples as disclosed herein. In some examples, aspects of the operations of 1510 may be performed by a reflection determination component 960 as described with reference to FIG. 9.

At 1515, the method may include configuring the reconfigurable surface at the first UE for reflecting the future transmission by the second UE based on the determining. The operations of 1515 may be performed in accordance with examples as disclosed herein. In some examples, aspects of the operations of 1515 may be performed by a reconfigurable surface configuration manager 935 as described with reference to FIG. 9.

Figure 16:
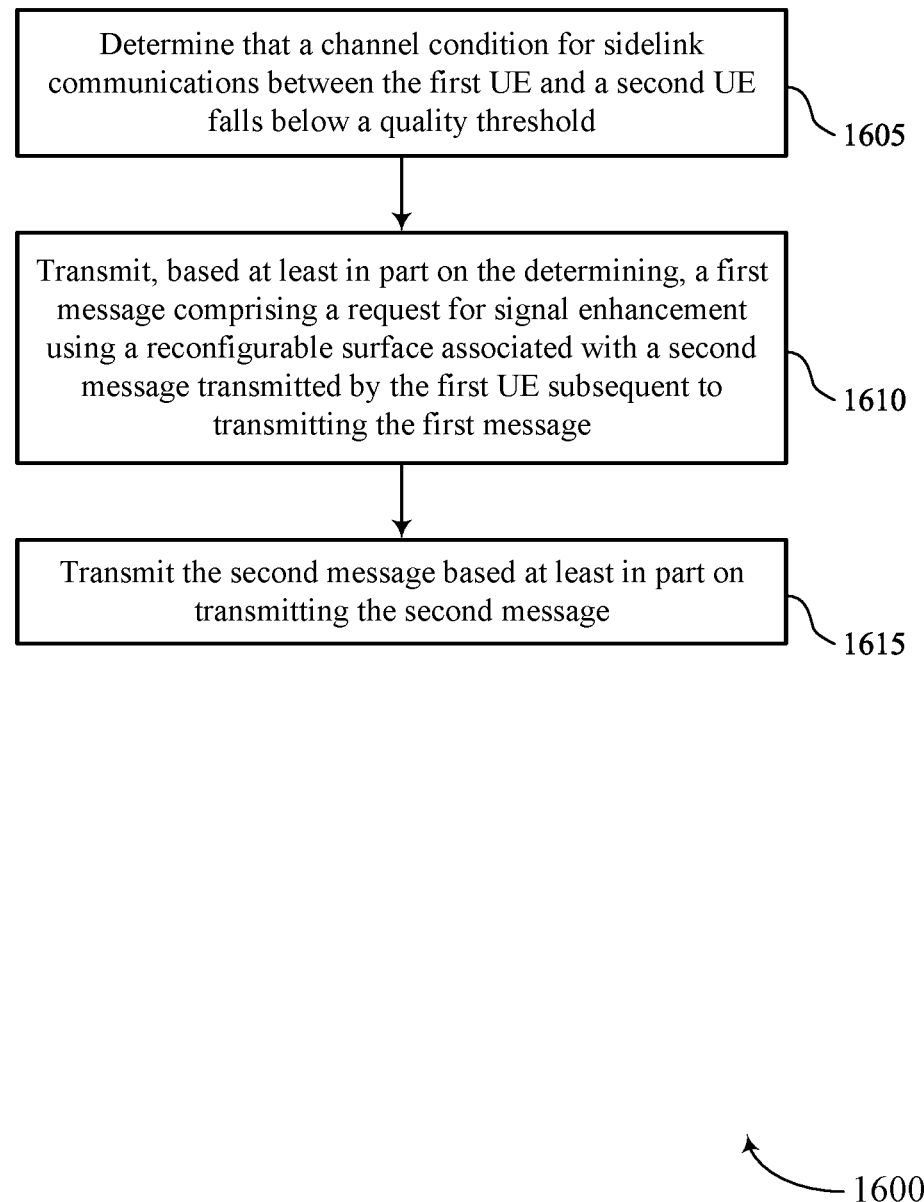

FIG. 16 shows a flowchart illustrating a method 1600 that supports reconfigurable surfaces for sidelink communications in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1605, the method may include determining that a channel condition for sidelink communications between the first UE and a second UE falls below a quality threshold. The operations of 1605 may be performed in accordance with examples as disclosed herein. In some examples, aspects of the operations of 1605 may be performed by a channel condition component 965 as described with reference to FIG. 9.

At 1610, the method may include transmitting, based on the determining, a first message including a request for signal enhancement using a reconfigurable surface, the request associated with a second message transmitted by the first UE subsequent to transmitting the first message. The operations of 1610 may be performed in accordance with examples as disclosed herein. In some examples, aspects of the operations of 1610 may be performed by a request transmitter 970 as described with reference to FIG. 9.

At 1615, the method may include transmitting the second message based on transmitting the second message. The operations of 1615 may be performed in accordance with examples as disclosed herein. In some examples, aspects of the operations of 1615 may be performed by a message transmission component 975 as described with reference to FIG. 9.

The following provides an overview of aspects of the present disclosure:

Aspect 1: A method for wireless communication at a first UE, comprising: detecting, at the first UE, an indication of a first message transmitted over sidelink resources from a second UE to a third UE; transmitting signaling indicating that retransmissions of the first message are reflected by a reconfigurable surface associated with the first UE; and configuring the reconfigurable surface associated with first UE for reflecting the retransmissions of the first message from the second UE.

Aspect 2: The method of aspect 1, further comprising: receiving control information from the second UE, wherein detecting the indication of the first message is based at least in part on receiving the control information.

Aspect 3: The method of aspect 2, further comprising: selecting one or more coefficients for configuring for the reconfigurable surface for reflecting the retransmissions of the first message based at least in part on the control information, information from one or more sensors at the first UE, map information at the first UE, or a combination thereof.

Aspect 4: The method of any of aspects 2 through 3, wherein the control information comprises a location of the second UE, an identifier of the third UE, a location of the third UE, a group identifier associated with one or both of the second UE and the third UE, a range associated with the first message, a priority associated with communications with UEs, a priority associated with communications with one or more sets of UEs, or a combination thereof.

Aspect 5: The method of any of aspects 2 through 4, wherein receiving the control information comprises: receiving sidelink control information, receiving a medium access control-control element, or a combination thereof.

Aspect 6: The method of any of aspects 1 through 5, wherein transmitting the signaling comprises: transmitting the signaling via a physical sidelink feedback channel using resources associated with feedback for the first message.

Aspect 7: The method of aspect 6, wherein transmitting the signaling further comprises: transmitting a first sequence from a first set of sequences, wherein the first set of sequences is unique from a second set of sequences associated with negative acknowledgement signaling and acknowledgement signaling.

Aspect 8: The method of any of aspects 1 through 7, wherein transmitting the signaling comprises: transmitting the signaling via a physical sidelink feedback channel using resources nonoverlapping with resources associated with feedback for sidelink transmissions.

Aspect 9: The method of aspect 8, wherein transmitting the signaling further comprises: transmitting a first sequence from a first set of sequences associated with negative acknowledgement signaling or a second sequence from a second set of sequences reserved for indicating that retransmissions of the first message are reflected by the reconfigurable surface.

Aspect 10: The method of any of aspects 1 through 9, wherein transmitting the signaling comprises: transmitting the signaling via a broadcast message or a groupcast message.

Aspect 11: The method of aspect 10, wherein the signaling further indicates a reference signal receive power for the retransmissions of the first message, power control information associated with the retransmissions reflected by the reconfigurable surface, beam steering information associated with the retransmissions reflected by the reconfigurable surface, a quantity of the retransmissions reflected by the reconfigurable surface, or a combination thereof.

Aspect 12: The method of any of aspects 1 through 11, further comprising: reflecting a retransmission of the first message from the second UE to the third UE based at least in part on the configuring.

Aspect 13: A method for wireless communication at a first UE, comprising: detecting, from a second UE, signaling indicating that retransmissions of a first message from a third UE to a fourth UE are reflected by a reconfigurable surface associated with the second UE; selecting a set of sidelink resources for sidelink communications by the first UE based at least in part on the detected signaling; and communicating using the selected set of sidelink resources.

Aspect 14: The method of aspect 13, wherein the selecting comprises: selecting the set of sidelink resources that are distinct from a second set of sidelink resources associated with the retransmissions of the first message based at least in part on the detecting.

Aspect 15: The method of any of aspects 13 through 14, further comprising: detecting, at the first UE, an indication of the first message from the third UE to the fourth UE; estimating a first reference signal receive power associated with the retransmissions of the first message based at least in part on detecting the indication of the first message, wherein detecting the signaling is based at least in part on the estimating; and estimating a second reference signal receive power associated with the retransmissions of the first message greater than the first reference signal receive power based at least in part on detecting the signaling indicating that the retransmissions of the first message are reflected by the reconfigurable surface, wherein the selecting is based at least in part on estimating the second reference signal receive power.

Aspect 16: The method of any of aspects 13 through 15, wherein detecting the signaling comprises: detecting the signaling within resources associated with feedback for the first message in a physical sidelink feedback channel.

Aspect 17: The method of aspect 16, wherein detecting the signaling further comprises: detecting a first sequence from a first set of sequences, wherein the first set of sequences is unique from a second set of sequences associated with negative acknowledgement signaling and acknowledgement signaling.

Aspect 18: The method of any of aspects 13 through 17, wherein detecting the signaling comprises: detecting the signaling within resources of a physical sidelink feedback channel that are nonoverlapping with resources associated with feedback for the first message.

Aspect 19: The method of aspect 18, wherein detecting the signaling further comprises: detecting a first sequence from a first set of sequences associated with negative acknowledgement signaling or a second sequence from a second set of sequences reserved for indicating that retransmissions of the first message are reflected by the reconfigurable surface.

Aspect 20: The method of any of aspects 13 through 19, wherein detecting the signaling comprises: detecting the signaling within a broadcast message or a groupcast message.

Aspect 21: The method of aspect 20, wherein the signaling further indicates a reference signal receive power for the retransmissions of the first message, power control information associated with the retransmissions reflected by the reconfigurable surface, beam steering information associated with the retransmissions reflected by the reconfigurable surface, a quantity of the retransmissions reflected by the reconfigurable surface, or a combination thereof.

Aspect 22: A method for wireless communications at a first UE comprising a reconfigurable surface, comprising: detecting, from a second UE, a message indicating a request for signal enhancement using a reconfigurable surface, the request associated with a future transmission by the second UE; determining to perform the signal enhancement for the future transmission by the second UE based at least in part on detecting the message; and configuring the reconfigurable surface at the first UE for reflecting the future transmission by the second UE based at least in part on the determining.

Aspect 23: The method of aspect 22, further comprising: transmitting, to the second UE, signaling indicating the performing of the signal enhancement at the first UE for the future transmission by the second UE, wherein the configuring is based at least in part on transmitting the signaling.

Aspect 24: The method of aspect 23, wherein transmitting the signaling comprises: transmitting the signaling via a physical sidelink feedback channel using resources associated with the message.

Aspect 25: The method of any of aspects 23 through 24, wherein transmitting the signaling comprises: transmitting the signaling via a physical sidelink shared channel.

Aspect 26: The method of aspect 25, wherein the signaling further indicates one or more transmissions parameters for the future transmission by the second UE.

Aspect 27: The method of any of aspects 22 through 26, wherein receiving the message comprises: receiving the message via sidelink control information or via a medium access control-control element.

Aspect 28: The method of any of aspects 22 through 27, wherein the message further indicates resources associated with the future transmission, a location associated with a target UE for the future transmission, an identifier associated with a group of UEs associated with the future transmission, or a combination thereof.

Aspect 29: A method for wireless communications at a first UE, comprising: determining that a channel condition for sidelink communications between the first UE and a second UE falls below a quality threshold; transmitting, based at least in part on the determining, a first message comprising a request for signal enhancement using a reconfigurable surface, the request associated with a second message transmitted by the first UE subsequent to transmitting the first message; and transmitting the second message based at least in part on transmitting the second message.

Aspect 30: The method of aspect 29, further comprising: receiving, from a third UE, signaling indicating that the third UE is performing the signal enhancement for the second message, wherein transmitting the second message is based at least in part on receiving the signaling.

Aspect 31: The method of aspect 30, wherein receiving the signaling comprises: receiving the signaling via a physical sidelink feedback channel using resources associated with the first message.

Aspect 32: The method of any of aspects 30 through 31, wherein receiving the signaling comprises: receiving the signaling via a physical sidelink shared channel.

Aspect 33: The method of aspect 32, wherein the signaling further indicates one or more transmissions parameters for the second message by the first UE.

Aspect 34: The method of any of aspects 29 through 33, wherein transmitting the first message comprises: transmitting the first message via sidelink control information or via a medium access control-control element.

Aspect 35: The method of any of aspects 29 through 34, wherein the first message further indicates resources associated with the second message, a location associated with the second UE, an identifier associated with a group of UEs including at least the second UE, or a combination thereof.

Aspect 36: An apparatus for wireless communication at a first UE, comprising a processor; memory coupled with the processor; and instructions stored in the memory and executable by the processor to cause the apparatus to perform a method of any of aspects 1 through 12.

Aspect 37: An apparatus for wireless communication at a first UE, comprising at least one means for performing a method of any of aspects 1 through 12.

Aspect 38: A non-transitory computer-readable medium storing code for wireless communication at a first UE, the code comprising instructions executable by a processor to perform a method of any of aspects 1 through 12.

Aspect 39: An apparatus for wireless communication at a first UE, comprising a processor; memory coupled with the processor; and instructions stored in the memory and executable by the processor to cause the apparatus to perform a method of any of aspects 13 through 21.

Aspect 40: An apparatus for wireless communication at a first UE, comprising at least one means for performing a method of any of aspects 13 through 21.

Aspect 41: A non-transitory computer-readable medium storing code for wireless communication at a first UE, the code comprising instructions executable by a processor to perform a method of any of aspects 13 through 21.

Aspect 42: An apparatus for wireless communications at a first UE comprising a reconfigurable surface, comprising a processor; memory coupled with the processor; and instructions stored in the memory and executable by the processor to cause the apparatus to perform a method of any of aspects 22 through 28.

Aspect 43: An apparatus for wireless communications at a first UE comprising a reconfigurable surface, comprising at least one means for performing a method of any of aspects 22 through 28.

Aspect 44: A non-transitory computer-readable medium storing code for wireless communications at a first UE comprising a reconfigurable surface, the code comprising instructions executable by a processor to perform a method of any of aspects 22 through 28.

Aspect 45: An apparatus for wireless communications at a first UE, comprising a processor; memory coupled with the processor; and instructions stored in the memory and executable by the processor to cause the apparatus to perform a method of any of aspects 29 through 35.

Aspect 46: An apparatus for wireless communications at a first UE, comprising at least one means for performing a method of any of aspects 29 through 35.

Aspect 47: A non-transitory computer-readable medium storing code for wireless communications at a first UE, the code comprising instructions executable by a processor to perform a method of any of aspects 29 through 35.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first user equipment (UE), comprising:
   detecting, at the first UE, an indication of a first message transmitted over sidelink resources from a second UE to a third UE;
   transmitting signaling indicating that retransmissions of the first message are reflected by a reconfigurable surface associated with the first UE; and
   configuring the reconfigurable surface associated with first UE for reflecting the retransmissions of the first message from the second UE.

2. The method of claim 1, further comprising:
   receiving control information from the second UE, wherein detecting the indication of the first message is based at least in part on receiving the control information.

3. The method of claim 2, further comprising:
   selecting one or more coefficients for configuring for the reconfigurable surface for reflecting the retransmissions of the first message based at least in part on the control information, information from one or more sensors at the first UE, map information at the first UE, or a combination thereof.

4. The method of claim 2, wherein the control information comprises a location of the second UE, an identifier of the third UE, a location of the third UE, a group identifier associated with one or both of the second UE and the third UE, a range associated with the first message, a priority associated with communications with UEs, a priority associated with communications with one or more sets of UEs, or a combination thereof.

5. The method of claim 2, wherein receiving the control information comprises:
   receiving sidelink control information, receiving a medium access control-control element, or a combination thereof.

6. The method of claim 1, wherein transmitting the signaling comprises:
   transmitting the signaling via a physical sidelink feedback channel using resources associated with feedback for the first message.

7. The method of claim 6, wherein transmitting the signaling further comprises:
   transmitting a first sequence from a first set of sequences, wherein the first set of sequences is unique from a second set of sequences associated with negative acknowledgement signaling and acknowledgement signaling.

8. The method of claim 1, wherein transmitting the signaling comprises:
   transmitting the signaling via a physical sidelink feedback channel using resources nonoverlapping with resources associated with feedback for sidelink transmissions.

9. The method of claim 8, wherein transmitting the signaling further comprises:
   transmitting a first sequence from a first set of sequences associated with negative acknowledgement signaling or a second sequence from a second set of sequences reserved for indicating that retransmissions of the first message are reflected by the reconfigurable surface.

10. The method of claim 1, wherein transmitting the signaling comprises:
    transmitting the signaling via a broadcast message or a groupcast message.

11. The method of claim 10, wherein the signaling further indicates a reference signal receive power for the retransmissions of the first message, power control information associated with the retransmissions reflected by the reconfigurable surface, beam steering information associated with the retransmissions reflected by the reconfigurable surface, a quantity of the retransmissions reflected by the reconfigurable surface, or a combination thereof.

12. The method of claim 1, further comprising:
    reflecting a retransmission of the first message from the second UE to the third UE based at least in part on the configuring.

13. An apparatus for wireless communication at a first user equipment (UE), comprising:
    a processor;
    memory coupled with the processor; and
    instructions stored in the memory and executable by the processor to cause the apparatus to:
       detect, at the first UE, an indication of a first message transmit over sidelink resources from a second UE to a third UE;

transmit signaling indicating that retransmissions of the first message are reflected by a reconfigurable surface associated with the first UE; and configure the reconfigurable surface associated with first UE for reflecting the retransmissions of the first message from the second UE.

14. The apparatus of claim 13, wherein the instructions are further executable by the processor to cause the apparatus to:

receive control information from the second UE, wherein detecting the indication of the first message is based at least in part on receiving the control information.

15. The apparatus of claim 14, wherein the instructions are further executable by the processor to cause the apparatus to:

select one or more coefficients for configuring for the reconfigurable surface for reflecting the retransmissions of the first message based at least in part on the control information, information from one or more sensors at the first UE, map information at the first UE, or a combination thereof.

16. The apparatus of claim 13, wherein the instructions to transmit the signaling are executable by the processor to cause the apparatus to:

transmit the signaling via a physical sidelink feedback channel using resources associated with feedback for the first message.

17. The apparatus of claim 13, wherein the instructions to transmit the signaling are executable by the processor to cause the apparatus to:

transmit the signaling via a physical sidelink feedback channel using resources nonoverlapping with resources associated with feedback for sidelink transmissions.

* * * * *